(12) United States Patent
Moon et al.

(10) Patent No.: US 9,794,899 B2
(45) Date of Patent: Oct. 17, 2017

(54) METHOD AND APPARATUS FOR OPERATING A BASE STATION AND A TERMINAL IN A WIRELESS COMMUNICATION SYSTEM USING UNLICENSED FREQUENCY BAND

(71) Applicant: Samsung Electronics Co., Ltd., Suwon-si, Gyeonggi-do (KR)

(72) Inventors: Jung-Min Moon, Suwon-si (KR); Anshuman Nigam, Bangalore (IN); Jung-Soo Jung, Seongnam-si (KR); Sun-Heui Ryoo, Yongin-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 14/790,595

(22) Filed: Jul. 2, 2015

(65) Prior Publication Data
US 2016/0007368 A1    Jan. 7, 2016

(30) Foreign Application Priority Data

Jul. 3, 2014   (KR) .................. 10-2014-0083194

(51) Int. Cl.
*H04W 72/12* (2009.01)
*H04L 5/00* (2006.01)
*H04W 56/00* (2009.01)
*H04B 1/02* (2006.01)
(Continued)

(52) U.S. Cl.
CPC ............. *H04W 56/00* (2013.01); *H04L 5/001* (2013.01); *H04L 5/0035* (2013.01); *H04L 5/0048* (2013.01); *H04L 5/0073* (2013.01); *H04W 16/14* (2013.01); *H04W 74/0808* (2013.01)

(58) Field of Classification Search
None
See application file for complete search history.

(56) References Cited

U.S. PATENT DOCUMENTS 8,792,900 B2    7/2014 Chen et al.
2008/0108366 A1   5/2008 Hu
(Continued)

FOREIGN PATENT DOCUMENTS

WO    2012038912 A1   3/2012
WO    2013/087835 A1   6/2013

*Primary Examiner* — Mohamed Kamara
*Assistant Examiner* — George Atkins, Jr.
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method and an apparatus for operating a base station and a terminal in a wireless communication system using an unlicensed band are provided. The base station can determine at least one channel in at least one unlicensed band using one of a single channel operation and a multi-channel operation, acquire the at least one channel according to a data transmission request, and transmit a channel preservation signal until a start point of a first subframe transmitted on the acquired at least one channel.

30 Claims, 21 Drawing Sheets

(51) Int. Cl.
  *H04W 16/14*  (2009.01)
  *H04W 74/08*  (2009.01)

(56) References Cited

U.S. PATENT DOCUMENTS

| | | | |
|---|---|---|---|
| 2011/0228742 A1* | 9/2011 | Honkasalo | H04L 5/0007 370/330 |
| 2013/0143502 A1 | 6/2013 | Kazmi et al. | |
| 2014/0044105 A1 | 2/2014 | Bontu et al. | |
| 2015/0189676 A1* | 7/2015 | Flammer, III | H04W 74/0808 370/337 |
| 2015/0264699 A1* | 9/2015 | Fwu | H04L 5/0001 370/329 |
| 2016/0294516 A1* | 10/2016 | Zirwas | H04L 5/0005 |

* cited by examiner

METHOD AND APPARATUS FOR OPERATING A BASE STATION AND A TERMINAL IN A WIRELESS COMMUNICATION SYSTEM USING UNLICENSED FREQUENCY BAND

CROSS-REFERENCE TO RELATED APPLICATION(S)

This application claims the benefit under 35 U.S.C. §119(a) of a Korean patent application filed on Jul. 3, 2014 in the Korean Intellectual Property Office and assigned Serial number 10-2014-0083194, the entire disclosure of which is hereby incorporated by reference.

TECHNICAL FIELD

The present disclosure relates to a wireless communication system for using an unlicensed frequency band. More particularly, the present disclosure relates to channel configuration and a listen-before-talk (LBT) based operation for enhancing frequency resource utilization in the wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A wireless communication system using an unlicensed frequency band operates a corresponding radio access technology (RAT) in the unlicensed frequency band, rather than a licensed frequency band. Unlike the licensed frequency band, the unlicensed frequency band is free from cost and has a wide bandwidth. Accordingly, the unlicensed frequency band can enhance system capacity and per-user throughput with a low cost. The biggest technical issue of the wireless communication system using the unlicensed frequency band is coexistence with another RAT, for example, wireless local area network (WLAN), in the existing unlicensed frequency band.

The WLAN adopts carrier sense multiple access with collision avoidance (CSMA/CA). In particular, the WLAN transmits a signal based on listen-before-talk (LBT). Such a wireless communication system using the unlicensed frequency band long term evolution unlicensed (LTE-U) needs to coexist with the WLAN. For doing so, the wireless communication system using the unlicensed frequency band can transmit a signal based on the LBT like the WLAN.

The wireless communication system carries out communication on a subframe basis. The first few symbols of the subframe contain control information used for communication between a base station and a terminal. The base station and the terminal can communicate with each other by sharing the control information. Since a device supporting the wireless communication system gets a transmission opportunity at an arbitrary time, the base station of the wireless communication system waits for a start of the subframe, that is, a subframe boundary in order to transmit the control information. However, while the base station of the wireless communication system awaits the subframe boundary, a WLAN device can determine an idle channel and transmit a signal on the channel. In this case, the base station of the wireless communication system can lose the signal transmission opportunity.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for preventing a communication system using an unlicensed frequency band from losing a transmission opportunity to another radio access technology (RAT) which shares the unlicensed frequency band.

Another aspect of the present disclosure is to provide a listen-before-talk (LBT) technique in a communication system communicating on a subframe basis.

In accordance with an aspect of the present disclosure, a method for operating a base station in a wireless communication system is provided. The method includes determining at least one channel in at least one unlicensed band using one of a single channel operation and a multi-channel operation, acquiring the at least one channel according to a data transmission request, and transmitting a channel preservation signal until a start point of a first subframe transmitted on the acquired at least one channel.

In accordance with another aspect of the present disclosure, a method for operating a terminal in a wireless communication system is provided. The method includes receiving carrier configuration information about a base station channel configuration in at least one unlicensed band, from the base station, identifying at least one channel determined by the base station based on the carrier configuration information, and receiving a subframe from the base station over the identified at least one channel.

In accordance with another aspect of the present disclosure, an apparatus of a base station in a wireless communication system is provided. The apparatus includes a communication unit configured to transmit a channel preservation signal, a channel determination unit configured to determine at least one channel in at least one unlicensed band using one of a single channel operation and a multi-channel operation, and a controller configured to acquire the at least one channel according to a data transmission request, and to transmit the channel preservation signal until a start point of a first subframe transmitted on the acquired at least one channel.

In accordance with another aspect of the present disclosure, an apparatus of a terminal in a wireless communication system is provided. The apparatus includes an interface configured to receive carrier configuration information about a base station channel configuration in at least one unlicensed band, from the base station, and a controller configured to identify at least one channel determined by the base station based on the carrier configuration information, and to receive a subframe from the base station over the identified at least one channel.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
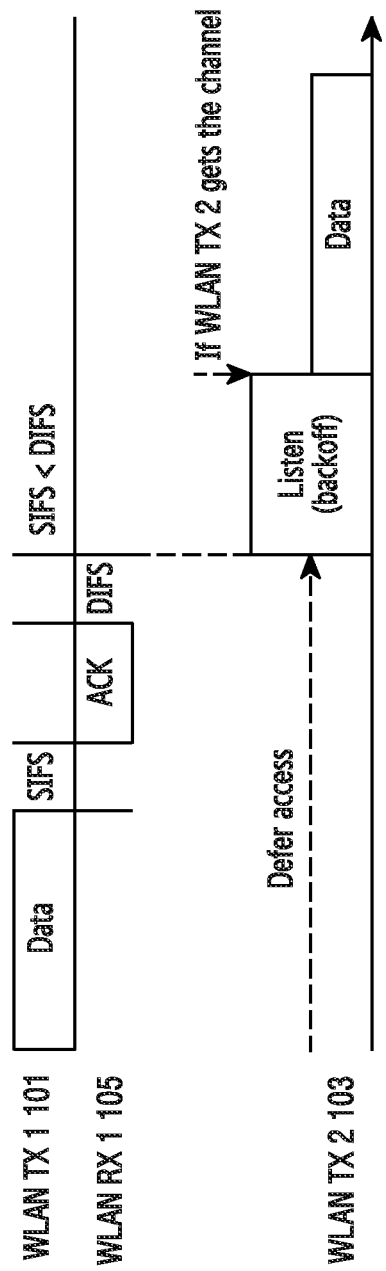
FIG. 1 illustrates channel contention of a wireless local area network (WLAN) and another WLAN device in a wireless communication system according to an embodiment of the present disclosure.

FIG. 1 depicts channel contention of a wireless local area network (WLAN) and another WLAN device in a wireless communication system according to an embodiment of the present disclosure. The WLAN is assumed to use an unlicensed frequency band.

Referring to FIG. 1, a carrier sense multiple access with collision avoidance (CSMA/CA) is explained. When a first WLAN transmitter (WLAN TX) 101 transmits data to a first WLAN receiver (WLAN RX) 105, the first WLAN RX 105 transmits an acknowledgement (ACK) to the first WLAN TX 101 after a short interframe space (SIFS) time. In so doing, a neighboring WLAN TX (e.g., including a second WLAN TX 103) senses a channel and waits without transmitting data when the channel is busy. The neighboring WLAN TX receiving the ACK recognizes the data transmission end of the first WLAN TX 101 and initiates backoff after a distributed coordination function (DCF) interframe space (DIFS) time. Herein, the second WLAN TX 103 selecting the smallest backoff number transmits data, and neighboring WLAN TXs excluding the second WLAN TX 103 recognizes the busy channel and waits without transmitting data. The backoff number is set to an arbitrary integer between 1 and contention window (CW), and a binary exponential backoff algorithm doubles the CW every time the data transmission fails.

To use an unlicensed band, a wireless communication system (e.g., a long term evolution (LTE)-unlicensed (LTE-U) needs to coexist with a WLAN which is using the unlicensed band. To this end, the following conditions should be at least satisfied.

(a) The LTE-U and the WLAN have the same maximum TX power.

(b) The LTE-U and the WLAN have the same maximum channel occupation time.

(c) The LTE-U and the WLAN transmit a signal based on the listen-before-talk (LBT) though their specific manners are different. That is, LTE-U base station and terminal can observe the channel during a certain time period and transmit a signal only when the channel is idle.

However, the following problems arise when the wireless communication system using the unlicensed band transmits a signal based on the LBT.

Since the LTE-U coexists with the WLAN and the WLAN operates based on the CSMA/CA, the LTE-U and WLAN devices cannot predict when the channel is idle. Based on the same reason, the LTE-U and WLAN devices cannot predict when to get the transmission opportunity using the LBT. This is the inherent feature of the CSMA/CA.

The WLAN TX immediately transmits a signal when the backoff counter becomes zero. Accordingly, when a collision does not arise, there is no time delay until the WLAN TX gets the transmission opportunity and communicates with the WLAN RX.

The LTE-U performs the communication on a subframe basis. That is, first few symbols of every subframe contain control information required for the communication between the base station and the terminal, and the base station and the terminal share the control information for their communication. Since the LTE-U device gets the transmission opportunity at a random time, the LTE-U base station awaits the start of the subframe, that is, the subframe boundary in order to transmit the control information. Although the channel is idle, the LTE-U base station waits until the start of the subframe without transmitting any signal. Accordingly, the WLAN device may determine the idle channel and transmit a signal. In this case, the LTE-U base station may lose the transmission opportunity.

1. Unlicensed Band and WLAN Channel Configuration

Typically, the unlicensed frequency band is configured based on 20 MHz.

Figure 2:
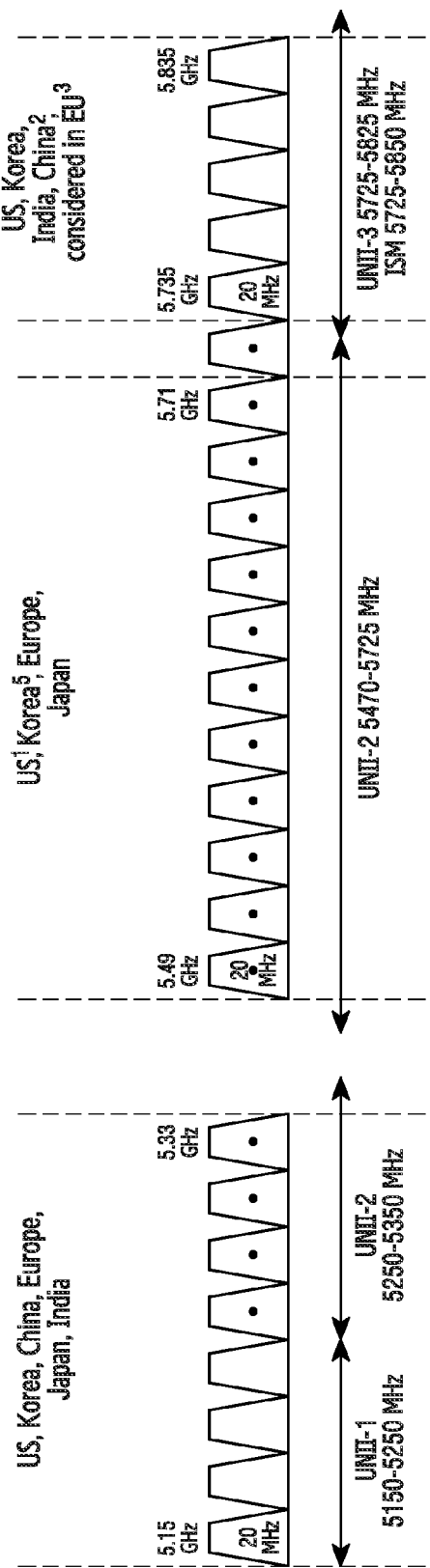
FIG. 2 illustrates unlicensed band channel configuration according to an embodiment of the present disclosure.

FIG. 2 depicts unlicensed band channel configuration according to an embodiment of the present disclosure. That is, in FIG. 2, a 2.4 GHz band channel of the WLAN is configured and multiple channels of 20 MHz bandwidth are combined in 802.11ac.

Referring to FIG. 2, the WLAN acquires the channel of the bandwidth corresponding to 20 MHz or its multiple according to CSMA/CA protocol. Since the wireless communication system using the unlicensed band (e.g., the LTE-U) considers the coexistence with the WLAN, the LTE-U also acquires the channel of the bandwidth corresponding to 20 MHz or its multiple through the contention with the WLAN.

The LTE bandwidth for the LTE-U is designed to operate in 1.4/3/5/10/15/20 MHz frequencies. The LTE is designed to utilize up to 100 MHz bandwidth by carrier-aggregating the multiple channels. Hence, when competing with the WLAN and acquiring a 20 MHz channel, the LTE-U can use the corresponding channel as a single channel and divide the corresponding channel into a plurality of subchannels. For example, the LTE can divide the 20 MHz channel into four 5 MHz channels or two 10 MHz channels. Such an operation can be referred to as a multi-channel operation of the LTE-U.

2. LTE-U Channel Configuration

To prevent the LTE-U base station from losing the transmission opportunity to the WLAN device, the LTE-U base station transmits a jamming signal from the transmission determination time until the control information acquisition, that is, until a subframe boundary. The jamming signal can be referred to as a channel preservation signal. When the LTE-U transmits the channel preservation signal, the WLAN device detects the channel, determines the busy channel, and then does not transmit data.

Figure 3:
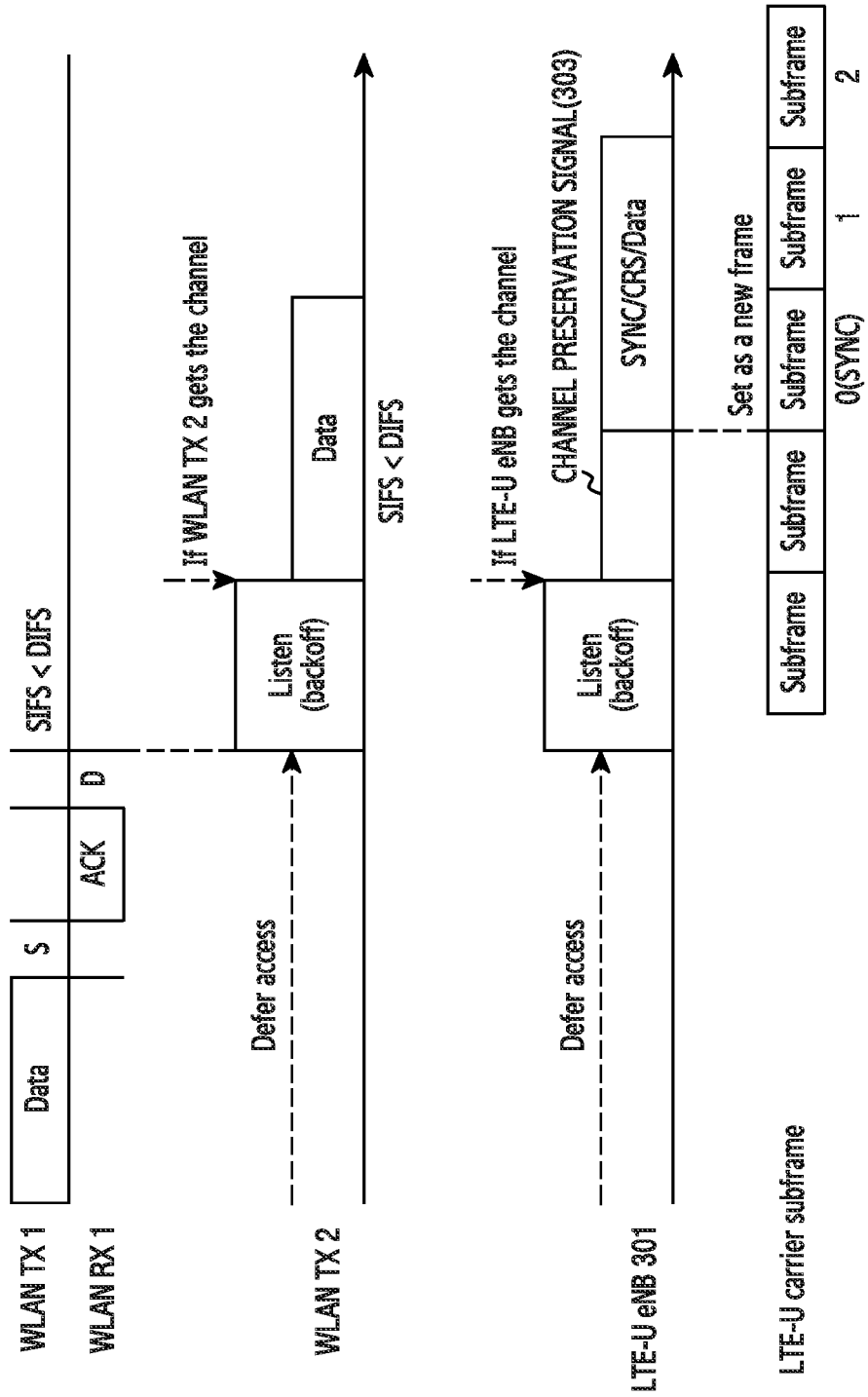
FIG. 3 illustrates a channel preservation signal transmitted by a base station for channel contention with a WLAN base station in a wireless communication system according to an embodiment of the present disclosure.

FIG. 3 depicts a channel preservation signal transmitted by a base station for channel contention with a WLAN base station in a wireless communication system according to an embodiment of the present disclosure.

Referring to FIG. 3, the LTE-U base station 301 transmits a channel preservation signal 303 from data transmission determination on the unlicensed band until an initial subframe boundary transmission. The transmission method of the channel preservation signal can differ according to a channel operation as follows.

Case 1: Single Channel Operation

The single channel operation operates the unlicensed channel 20 MHz as a single channel.

Figure 4:
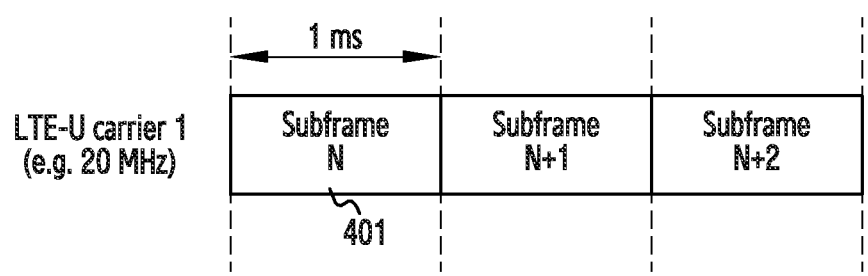
FIG. 4 illustrates single channel configuration in a wireless communication system according to an embodiment of the present disclosure.

FIG. 4 depicts single channel configuration in a wireless communication system according to an embodiment of the present disclosure.

Referring to FIG. 4, a time between two subframes that fall most closely is a subframe length 401, for example, 1 ms. Such a time signifies that the LTE-U terminal waits 0~1 ms in order to acquire the channel at a random time and to receive the control information. As such, when a data transmission using the single channel (e.g., 20 MHz) is required, the LTE base station transmits a channel preservation signal from the required time to the start point of the subframe carrying the data.

Case 2: Synchronous Multi-channel Operation

The synchronous multi-channel operation divides the unlicensed band into a plurality of channels and synchronizes the channels. For example, when the unlicensed band is a 20 MHz channel, the synchronous multi-channel operation can divide 20 MHz into four 5 MHz channels and then synchronize the four divided channels.

Figure 5:
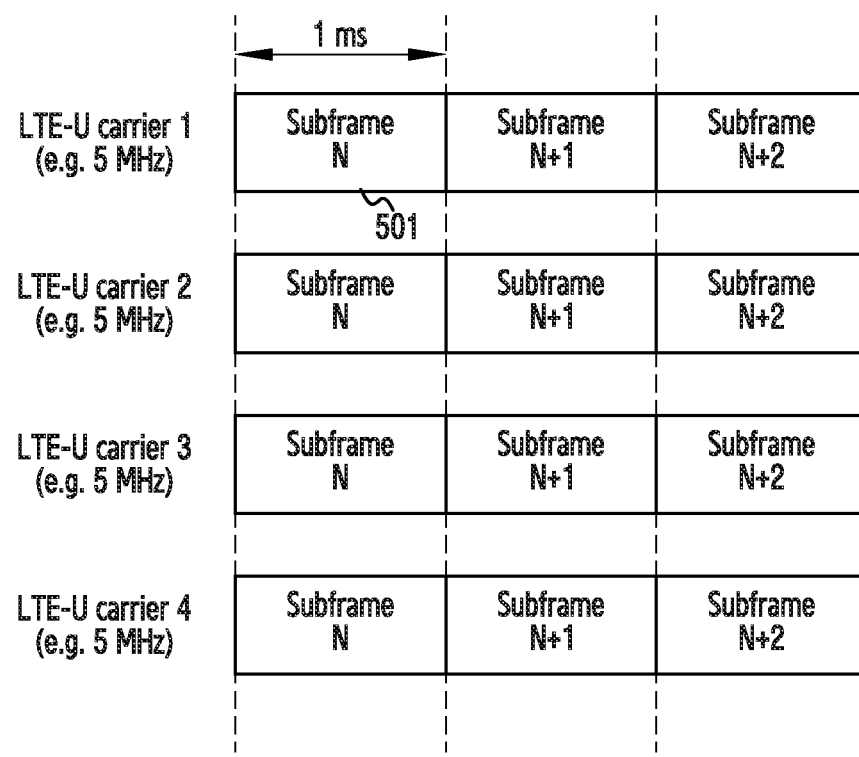
FIG. 5 illustrates synchronous multi-channel configuration in a wireless communication system according to an embodiment of the present disclosure.

FIG. 5 depicts synchronous multi-channel configuration in a wireless communication system according to an embodiment of the present disclosure.

Referring to FIG. 5, a time between two subframes that fall most closely is a subframe length 501, for example, 1 ms. The time is the subframe length because the divided channels (e.g., four 5 MHz channels) are synchronized. Such a time signifies that the LTE-U terminal waits 0~1 ms in order to acquire the channel at a random time and to receive the control information. As such, when a data transmission using the synchronous multi-channel (e.g., four 5 MHz) is required, the LTE base station transmits a channel preservation signal from the required time to the start point of the subframe carrying the data.

When the channel preservation signal is carried on the single channel or the synchronous multi-channel, the WLAN device senses at least one channel, determines the busy channel, and does not transmit any data over the corresponding channel. However, the channel preservation signal transmission is subject to the following shortcomings in the wireless communication system adopting the single channel operation or the synchronous multi-channel operation. First, when the channel preservation signal is transmitted, information is not transmitted and received between the LTE-U base station and the terminal. Second, when the channel preservation signal is transmitted, the WLAN device cannot use the channel. Third, the channel preservation signal transmission interferes with the other LTE-U device which uses the same channel. Thus, the present disclosure provides a new channel operation method for minimizing the use of the channel preservation signal and avoiding the LTE-U device, which awaits the subframe boundary, from losing the channel to the WLAN device.

Case 3: Asynchronous Multi-channel Operation

The Asynchronous multi-channel operation divides the unlicensed band into a plurality of channels and asynchronizes the channels. For example, when the unlicensed band is 20 MHz, the asynchronous multi-channel operation divides the 20 MHz channel into four 5 MHz channels and asynchronizes the divided channels.

For example, the asynchronous multi-channel operation asynchronizes the channels at regular intervals in the time duration of one subframe.

Figure 6:
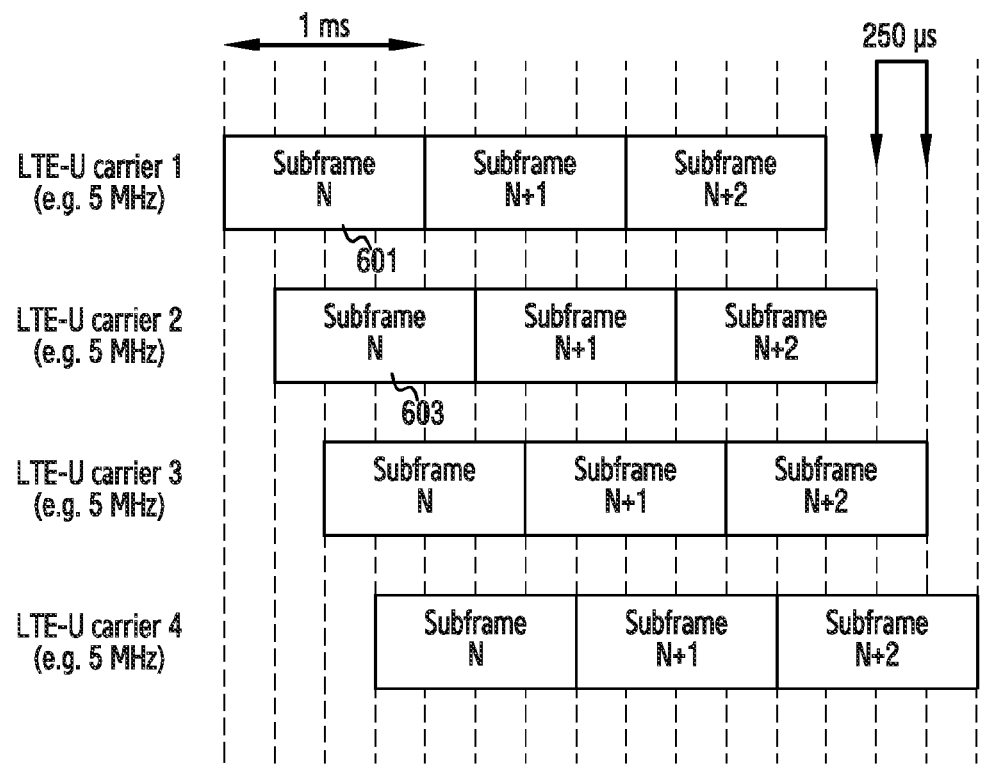
FIG. 6 illustrates asynchronous multi-channel configuration in a wireless communication system according to an embodiment of the present disclosure.

FIG. 6 depicts asynchronous multi-channel configuration in a wireless communication system according to an embodiment of the present disclosure.

Referring to FIG. 6, when four 5 MHz channels are sequentially synchronized at quartered times of a subframe duration (e.g., 1 ms), the time between two subframes 601 and 603 on different channels can be 250 µs. As such, the time between the two subframes that fall most closely can be 250 µs by dividing a subframe length by the number of the channels. The time interval is 250 µs because the four 5 MHz channels exist in the subframe duration at regular time intervals. Such a time interval signifies that the LTE-U terminal, after acquiring the channel at a random time, waits 0 ms~250 µs to receive the control information.

Figure 7:
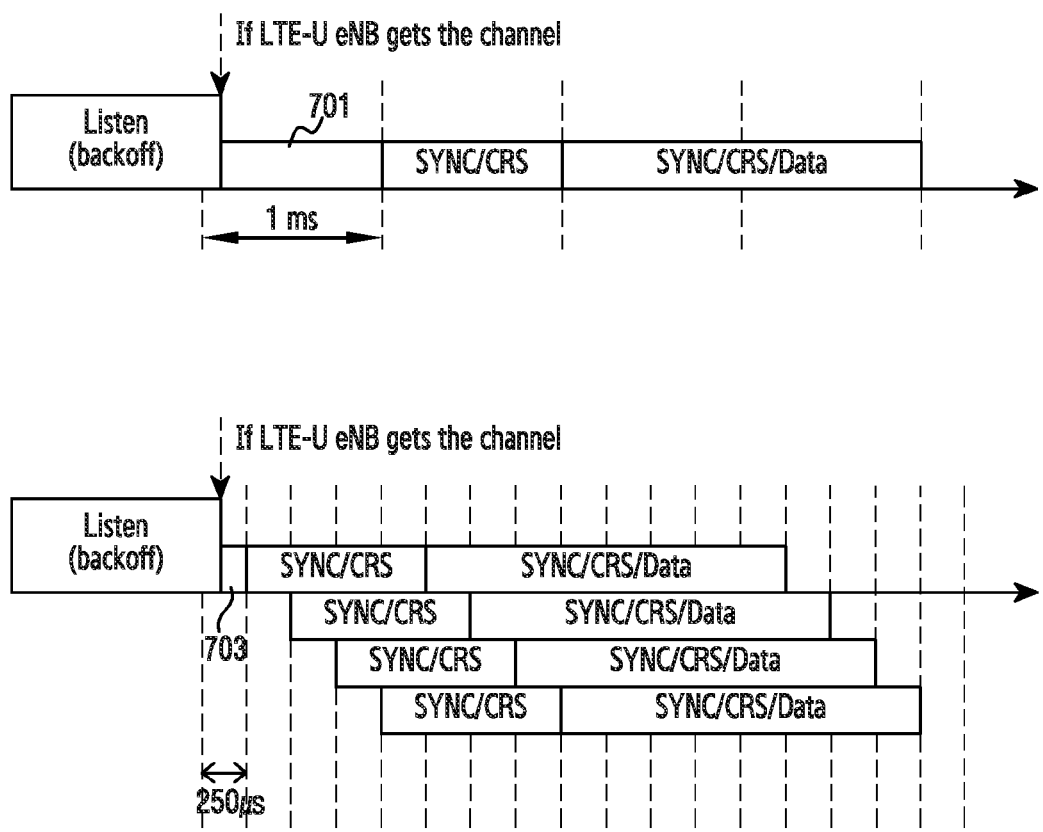
FIG. 7 illustrates a channel preservation signal transmitted by a base station in a wireless communication system according to an embodiment of the present disclosure.

FIG. 7 depicts a channel preservation signal transmitted by a base station in a wireless communication system according to an embodiment of the present disclosure.

Referring to FIG. 7, the LTE-U divides the 20 MHz channel used as the basic unit by the WLAN, and then sets equal or unequal subframe boundaries of the divided channels within one subframe. Compared to a single channel operation 701 or a synchronous multi-channel operation, an asynchronous multi-channel operation 703 gains the following advantages.

First, since the time for the LTE-U terminal to receive the control information is shortest, the time for the LTE-U base station to unnecessarily transmit the channel preservation signal can be lessened. As such, by minimizing the use of the channel preservation signal, the LTE-U base station can give more communication opportunities to another LTE-U device or the WLAN device and to mitigate interference from the channel preservation signal. Second, the LTE-device can acquire the channel and then initiate actual data transmission and reception most rapidly. Thus, when transmitting data of the same volume, the asynchronous multi-channel operation can finish the data transmission and reception most quickly, compared to the single channel operation or the synchronous multi-channel operation. Hence, the LTE-U base station can rapidly provide a new communication opportunity to the other LTE-U device or the WLAN device and to enhance frequency resource utilization.

To apply the asynchronous multi-channel operation to a wireless communication environment including a plurality of base stations, the wireless communication system can satisfy the following conditions.

Figure 8:
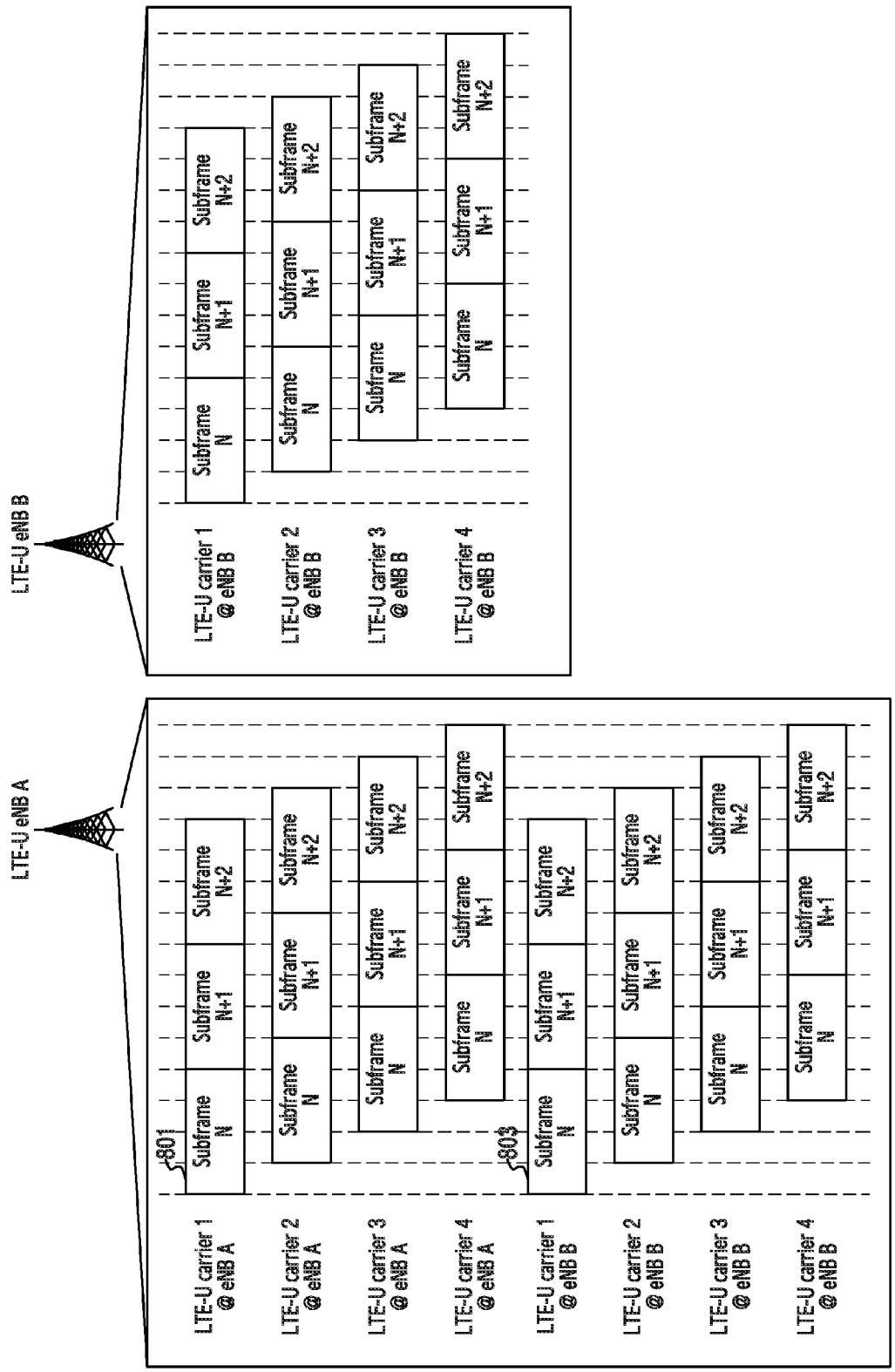
FIG. 8 illustrates synchronous multi-channel configuration among long term evolution unlicensed (LTE-U) base stations in a wireless communication system according to an embodiment of the present disclosure.

FIG. 8 depicts synchronous multi-channel configuration among LTE-U base stations in a wireless communication system according to an embodiment of the present disclosure. A plurality of channels (e.g., four 5 MHz channels) used in the base station can have different subframe boundaries in the subframe duration. Yet, the same channels used by different base stations can be synchronized.

Referring to FIG. 8, a first channel 801 used by an LTE-U evolved node B (eNB) A and a first channel 803 used by an LTE-U eNB B can be synchronized. When this condition is satisfied, the eNB A and the eNB B can adopt base station cooperative communication such as coordinated multipoint (CMP) and inter-cell interference coordination (ICIC). However, this condition is not satisfied when the base station cooperative communication is not adopted or the base stations are too apart from each other to interfere with each other.

The LTE-U base station and the terminal share information about the channel configuration and the synchronization.

Figure 9:
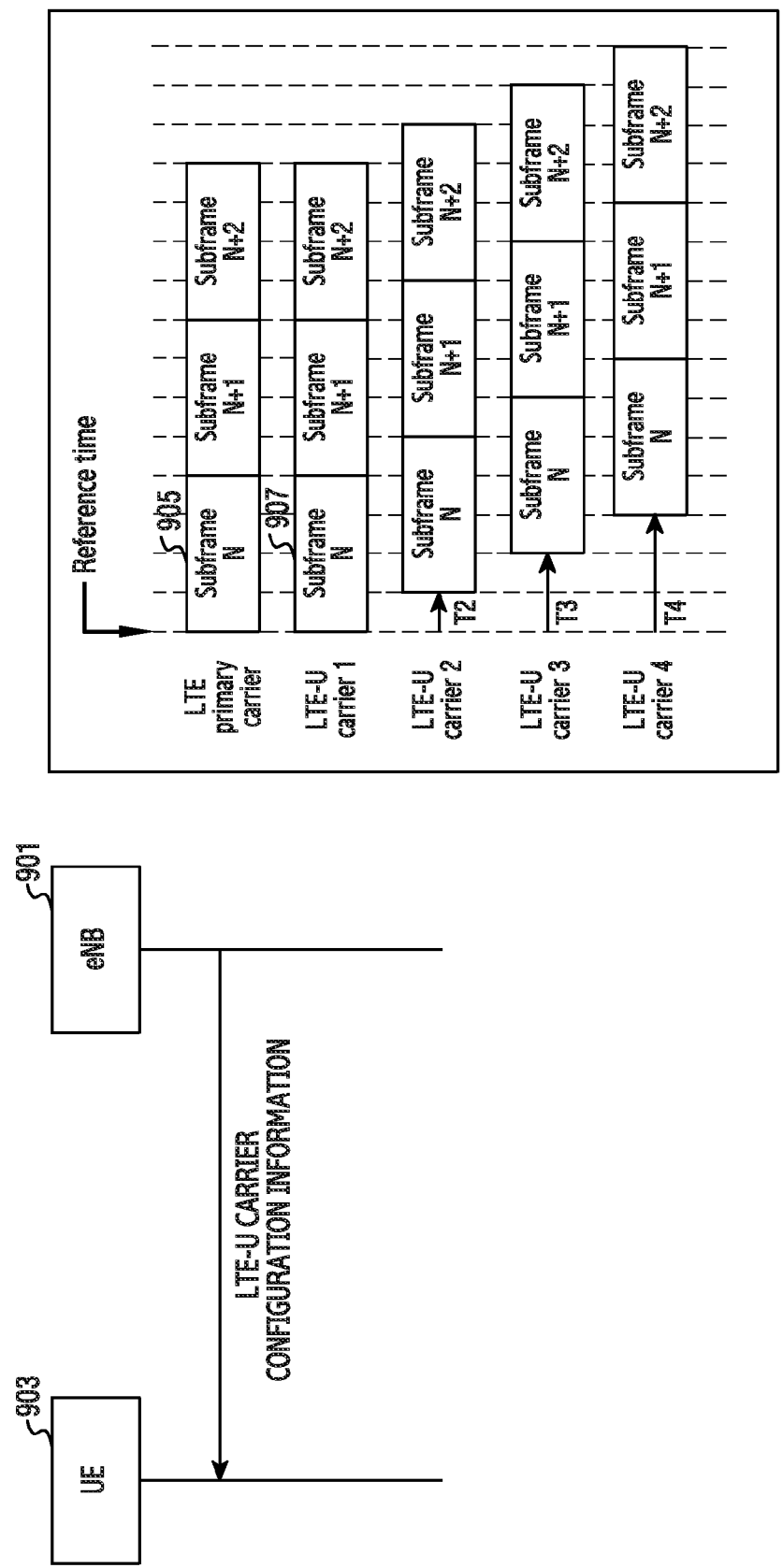
FIG. 9 illustrates a method for sharing carrier configuration information in a wireless communication system according to an embodiment of the present disclosure.

FIG. 9 is a flowchart of a method for sharing carrier configuration information in a wireless communication system according to an embodiment of the present disclosure.

Referring to FIG. 9, an LTE-U base station 901 (or eNB) generates and transmits LTE-U carrier configuration information to an LTE-U terminal 903 (or user equipment (UE)). Herein, the LTE-U carrier configuration information (or channel configuration information) can include channel division information and channel synchronization information. The channel division information can include division information about whether the unlicensed channel is divided or not, and information about the divided channels when the unlicensed channel is divided. The channel synchronization information can include synchronization information about whether the divided channels are synchronous or asynchronous and asynchronization information when the divided channels are asynchronous.

For example, when the unlicensed channel 20 MHz is divided into two or more channels and asynchronous, the LTE-U carrier configuration information can include channel division information of the divided channels and channel synchronization information about the asynchronization of the divided channels. For example, the channel division information can include division information indicating the divided unlicensed channel, and information including a center frequency, a start frequency, and an end frequency of the divided channels. The channel synchronization information can include synchronization information indicating that the divided channels are asynchronous, and frequency band and subframe boundary start information of the divided channels. For example, the subframe boundary start information can include timing offset information of the divided channels 907 based on an LTE primary cell (PCell) carrier 905.

To share the carrier configuration information between the LTE-U base station and the terminal, the LTE-U base station can transmit the channel preservation signal including the carrier configuration information to the terminal.

The LTE-U is based on carrier aggregation with the LTE, and the LTE-U carrier signal is transmitted from the base station which transmits the LTE carrier signal. Accordingly, when the terminal is synchronized with the LTE, the terminal can infer the LTE-U synchronization based on the LTE synchronization. Since the center frequency of the LTE carrier and the center frequency of the LTE-U carrier are different, the LTE-U synchronization information inferred from the LTE synchronization can be incorrect. Hence, a method for acquiring the LTE-U synchronization can be demanded.

Basically, the LTE can include synchronization signals, that is, a primary synchronization signal (PSS) and a secondary synchronization signal (SSS) in a 0-th subframe and a fifth subframe. The terminal can preserve the synchronization with the LTE by continuously receiving such synchronization signals. However, the LTE-U base station cannot continuously transmit the PSS and the SSS because the LTE-U base station cannot transmit any signal when the WLAN device occupies the unlicensed band.

Thus, the present disclosure provides a method of the LTE-U terminal for acquiring the LTE-U synchronization as follows. First, the LTE-U base station can always set the first subframe transmitted after occupying the channel, to a 0-th subframe and insert a plurality of PSSs and SSSs into the 0-th subframe.

Figure 10:
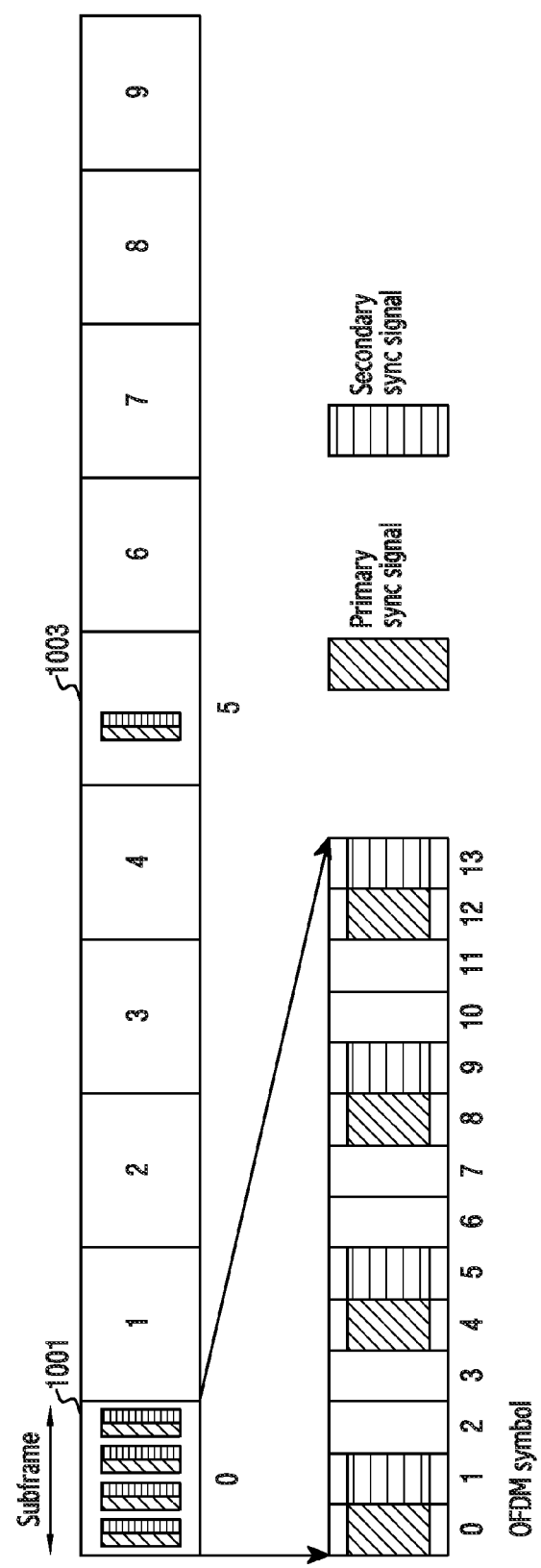
FIG. 10 illustrates a frame structure for carrying a synchronous signal in a wireless communication system according to an embodiment of the present disclosure.

FIG. 10 depicts a frame structure for carrying a synchronization signal in a wireless communication system according to an embodiment of the present disclosure.

For example, the LTE-U base station can transmit the synchronization signal using a 0-th subframe 1001 as shown in FIG. 10. The terminal can increase a possibility of acquiring the LTE-U synchronization through the 0-th subframe. For example, after transmitting the synchronization signal using the 0-th subframe 1001, the LTE-U base station can transmit a synchronization signal using a fifth subframe 1003 as shown in FIG. 10.

Second, the LTE-U base station can transmit a channel preservation signal from its channel occupation time to the first subframe boundary, for example, to the 0-th subframe start. In so doing, the LTE-U base station can transmit the channel preservation signal including a plurality of PSSs and SSSs. The channel preservation signal can be used not only to restrict channel access of another WLAN device but to acquire the LTE-U synchronization in the LTE-U terminal. In addition, the 0-th subframe and the channel synchronization signal can further include a cell-specific reference signal as well as the PSS and the SSS, and the terminal may estimate the channel using the cell-specific reference signal.

The asynchronous multi-channel operation divides one 20 MHz channel into two or more channels and distributes the subframe boundaries of the divided channels in the time domain as uniformly as possible. However, the same operation can be applied when the base station uses two or more 20 MHz channels.

Figure 11:
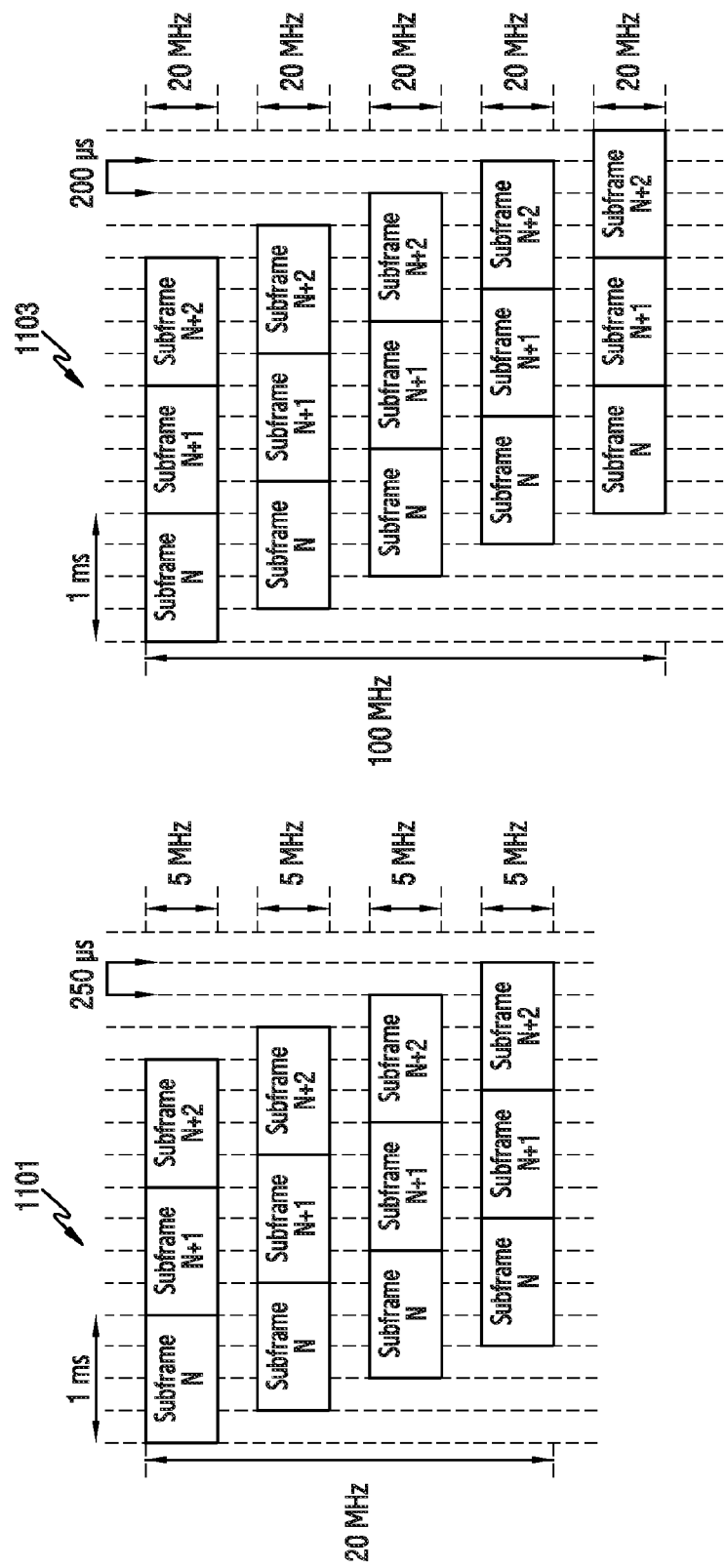
FIGS. 11A and 11B illustrate multi-channel configuration in a wireless communication system according to an embodiment of the present disclosure.

FIGS. 11A and 11B depict multi-channel configuration in a wireless communication system according to an embodiment of the present disclosure.

Referring to FIGS. 11A and 11B, when the LTE-U base station can use one unlicensed band 20 MHz, first multi-channel configuration 1101 divides the 20 MHz channel into four 5 MHz multi-channels. In this case, the subframe start interval between the channels can be, for example, 250 μs. By contrast, when the LTE-U base station can use five unlicensed band 20 MHz channels, that is, 100 MHz in total, second multi-channel configuration 1103 uses the five channels as an individual channel. In this case, the subframe start interval between the channels can be, for example, 200 μs. Accordingly, the LTE-U terminal can obtain up to five scheduling information in 1 ms being the subframe duration. Thus, the base station and the terminal can rapidly initiate the communication within a shorter time than 1 ms.

3. LBT of LTE-U

The present disclosure provides the asynchronous multi-channel operation to reduce the time between the subframes that fall most closely. Using the present asynchronous multi-channel operation, the LTE-U can reduce the use of the channel preservation signal. Now, the present disclosure provides the LBT based on the asynchronous multi-channel operation.

First, it is assumed that a wireless communication system includes one LTE-U base station and one terminal. In this case, the LTE-U base station can acquire the channel every time it participates in channel contention because there is no competitor such as a WLAN device in the wireless communication system. Accordingly, the LTE-U base station may not transmit the channel preservation signal. However, provided that the wireless communication system includes an LTE-U base station, a terminal, and a great number of WLAN devices, the LTE-U base station can transmit the channel preservation signal because the WLAN device can take the channel while the LTE-U terminal waits for the control information.

Second, it is assumed that the time between the subframe boundaries defined by the asynchronous multi-channel operation is extremely short (e.g., 250 μs). In this case, the channel preservation signal can be transmitted within a very short time. This can signify low need for the channel preservation signal. However, when the time (e.g., close to 1 ms) between the subframe boundaries defined by the asynchronous multi-channel operation is long enough, it takes a long time for the LTE-U terminal to acquire the control information, which implies great need for the channel preservation signal.

Third, latency of a packet to be transmitted by the LTE base station is considered. For a packet to transmit quickly, the LTE base station should occupy the channel and accordingly the channel preservation signal is very much needed. However, the channel preservation signal is not needed as much for a non-urgent packet to transmit such as file transfer protocol (FTP) traffic.

As above, the present disclosure provides two LBT modes as shown in Table 1.

TABLE 1

| | Access timing | Channel preservation signal |
|---|---|---|
| Mode 1 | Random time instant | Use |
| Mode 2 | Quantized time instant | Do not use |
| Decision | (a) Time between boundaries of two subframes that fall most closely | |
| | (b) Channel occupancy (c) Packet latency | |

In the first mode, the data transmission determination time is a random time instant and the LTE-U base station can use the channel preservation signal to acquire the channel. In the second mode, the data transmission is determined at the subframe boundary and the LTE-U base station may not use the channel preservation signal to acquire the channel.

Figure 12:
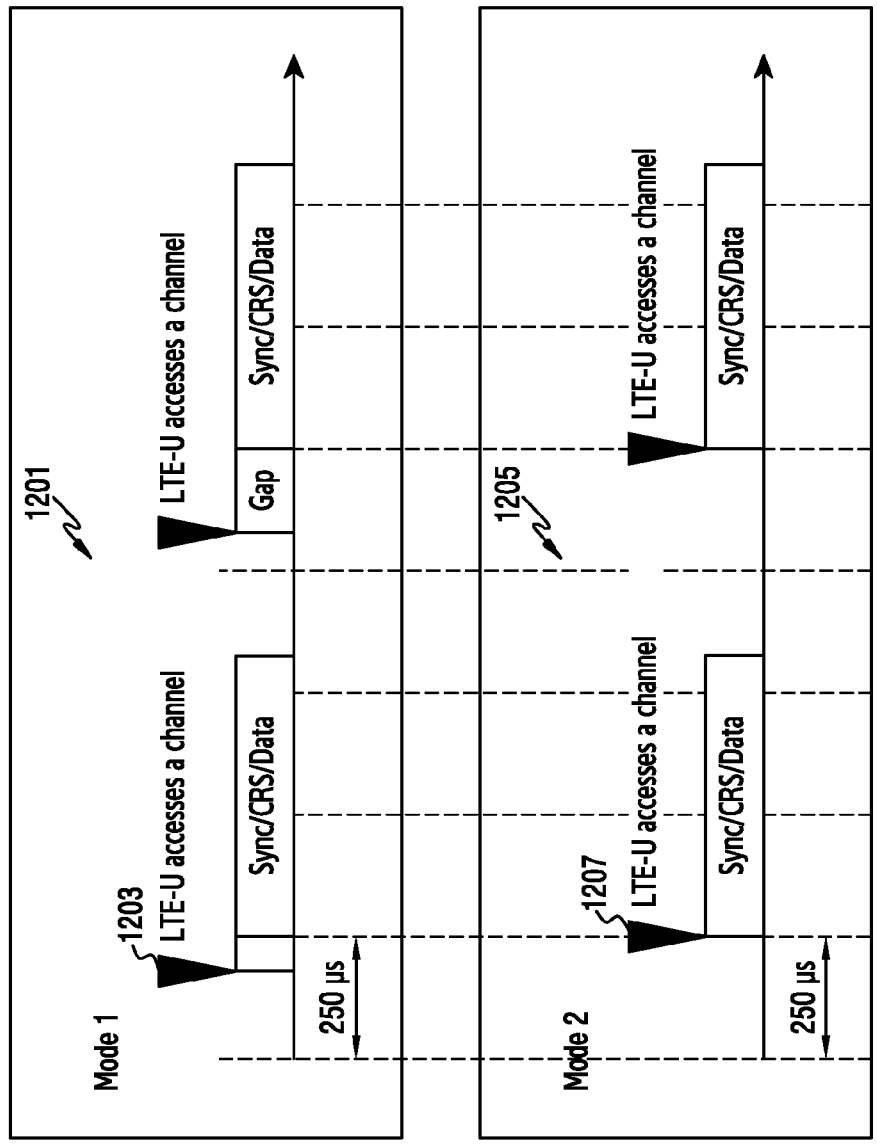
FIG. 12 illustrates a plurality of listen-before-talk (LBT) modes in a wireless communication system according to an embodiment of the present disclosure.

FIG. 12 depicts a plurality of LBT modes in a wireless communication system according to an embodiment of the present disclosure.

Referring to FIG. 12, in the first mode 1201, the LTE-U base station acquires a transmission opportunity 1203 at a random time, transmits the channel preservation signal until the LTE-U base station transmits the control information, for example, until a new subframe boundary, and initiates data transmission and reception after the LTE-U terminal acquires the control information. In the second mode 1205, the LTE-U base station adjusts a listening period so that the LTE-U base station gets the transmission opportunity at the subframe boundary, and then transmits and receives data without the channel preservation signal so that the LTE-U terminal can acquire the control information at a subframe boundary 1207. The first mode 1201 does not lose the channel to the other LTE-U device or the WLAN device but diminishes the frequency utilization. By contrast, the second mode 1205 can lose the channel because it does not use the channel preservation signal but increases the frequency utilization. Hence, the present disclosure can adaptively select the first mode 1201 and the second mode 1205 according to a situation.

Figure 13:
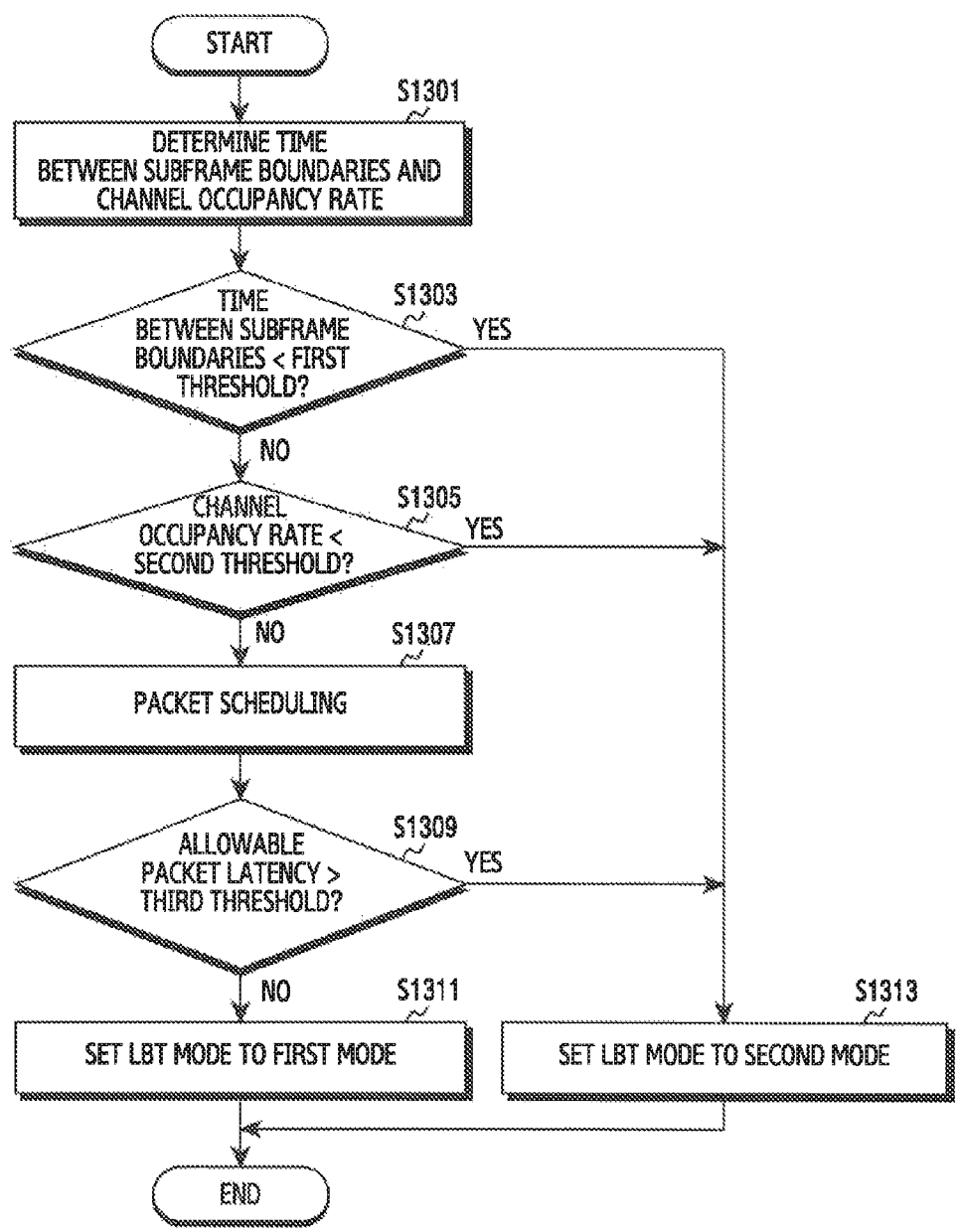
FIG. 13 illustrates a method for determining an LBT mode in a base station of a wireless communication system according to an embodiment of the present disclosure.

FIG. 13 is a flowchart of a method for determining an LBT mode in a base station of a wireless communication system according to an embodiment of the present disclosure.

Referring to FIG. 13, in operation S1301, the LTE-U base station can determine how to configure the unlicensed band (e.g., 20 MHz) using the asynchronous multi-channel operation and obtain the time between the subframe boundaries of the channels according to the determined configuration. The LTE-U base station can determine an occupancy rate (or a collision rate) of the unlicensed channel. Herein, the occupancy rate of the unlicensed channel can indicate how many LTE-U and WLAN devices exist in the corresponding channel.

In operation S1303, the LTE-U base station can compare the time between the determined subframe boundaries with a first threshold. The first threshold can be predefined. When the time between the determined subframe boundaries falls below the first threshold, the LTE-U base station goes to operation S1313. Otherwise, the LTE-U base station goes to operation S1305.

In operation S1305, the LTE-U base station can compare the channel occupancy rate of the determined unlicensed channel with a second threshold. The second threshold can be predefined. When the channel occupancy rate of the determined unlicensed channel falls below the second threshold, the LTE-U base station goes to operation S1313. Otherwise, the LTE-U base station goes to operation S1307.

In operation S1307, the LTE-U base station can schedule at least one packet to transmit to at least one LTE-U terminal. In operation S1309, the LTE-U base station can compare an allowable latency of the scheduled packet with a third threshold. The third threshold can be predefined. When the allowable latency of the scheduled packet exceeds the third threshold, the LTE-U base station goes to operation S1313. Otherwise, the LTE-U base station goes to operation S1311.

In operation S1311, the LTE-U base station can set the LBT mode to the first mode. In operation S1313, the LTE-U base station can set the LBT mode to the second mode.

Next, the LTE-U base station and the terminal can share the carrier configuration information and the LBT mode information. For example, as shown in FIG. 9, the LTE-U base station can transmit to the LTE-U terminal, the center frequency, start frequency, end frequency, frequency band, and subframe boundary start information of the divided channels being the LTE-U channel configuration information and the determined LBT mode (the first mode or the second mode) information.

While the operations are sequentially illustrated in FIG. 13, they can be performed independently, changed in order, or omitted.

Figure 14:
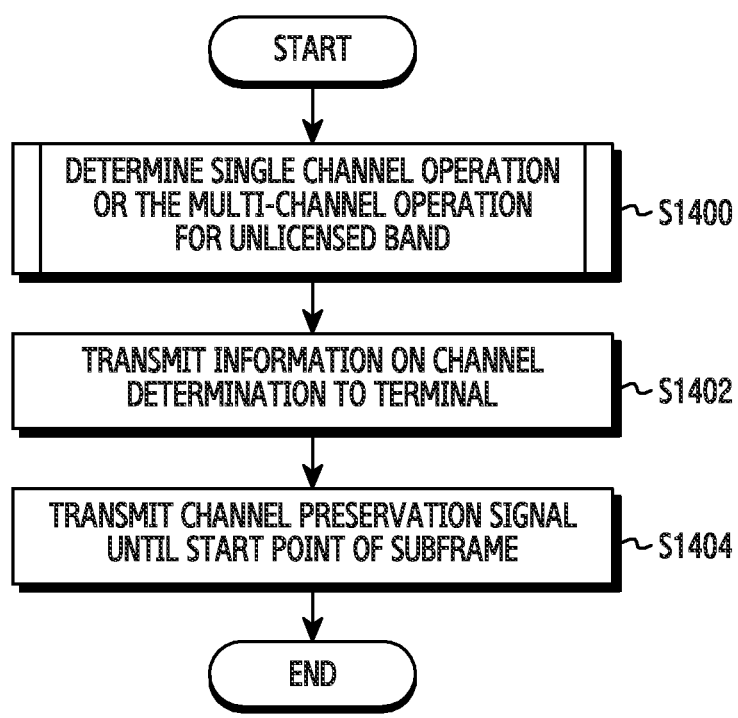
FIG. 14 illustrates a method for transmitting a channel preservation signal in a base station of a wireless communication system according to an embodiment of the present disclosure.

FIG. 14 is a flowchart of a method for transmitting a channel preservation signal in a base station of a wireless communication system according to an embodiment of the present disclosure.

Referring to FIG. 14, in operation S1400, the LTE-U base station can determine one of the single channel operation and the multi-channel operation for at least one unlicensed band. Upon determining the single channel operation, the LTE-U based station can configure the unlicensed channel using the single channel operation. For example, the LTE-U base station can acquire and operate the 20 MHz channel of the unlicensed band as the single channel as shown in FIG. 4. By contrast, upon determining the multi-channel operation, the LTE-U based station can configure the unlicensed channel using one of the synchronous multi-channel operation and the asynchronous multi-channel operation, to be further explained by referring to FIG. 15 and FIG. 16.

In operation S1402, the LTE-U base station can generate the carrier configuration information based on the channel operation determined in operation S1400, and transmit the generated carrier configuration information to the terminal. For example, the carrier configuration information can include the channel division information and the channel synchronization information. For example, the carrier configuration information can include at least one of the center frequency, the start frequency, the end frequency, the frequency band, and the subframe boundary start information of the single channel or the multi-channels.

For example, when the unlicensed channel 20 MHz are divided into two or more channels and asynchronous, the LTE-U carrier configuration information can include the channel division information of the divided channels and the channel synchronization information of the divided channels asynchronized. For example, the channel division information can include the division information indicating the unlicensed channel divided, and the information including the center frequency, the start frequency, and the end frequency of the divided channels. The channel synchronization information can include the synchronization information indicating that the divided channels are asynchronous, and the frequency band and subframe boundary start information of the divided channels. For example, the subframe boundary start information can include the timing offset information of the divided channels 907 based on an LTE PCell carrier 905.

In operation S1404, when data transmission using the single channel or the multi-channels is required, the LTE-U base station can transmit the channel preservation signal until the start point of the subframe for the data transmission. For example, the transmitting can include broadcasting. The LTE-U base station can transmit at least one of the PSS, the SSS, and the cell-specific reference signal for the synchronization with the LTE-U terminal over the channel preservation signal. For example, the LTE-U base station can transmit the synchronization signal (SSS, PSS) and the carrier configuration information over the channel preservation signal.

As such, the LTE-U base station can transmit the channel preservation signal including the plurality of the PSSs and the SSSs from its channel occupation time to the first subframe, for example, to the 0-th subframe start. In this case, the channel preservation signal can be used not only to limit the channel access of another WLAN device but also to synchronize the terminal with the LTE-U base station. Alternatively, the channel preservation signal can carry the cell-specific reference signal as well as the synchronization signal so that the terminal can estimate the channel.

Figure 15:
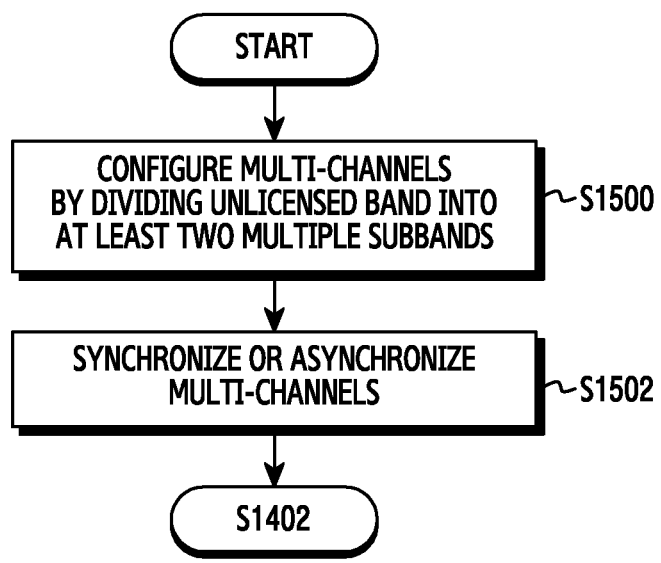
FIG. 15 illustrates a method for setting a multi-channel in a base station of a wireless communication system according to an embodiment of the present disclosure.

FIG. 15 is a flowchart of a method for configuring a multi-channel in a base station of a wireless communication system according to an embodiment of the present disclosure.

Referring to FIG. 15, in operation S1500, the LTE-U base station can configure multi-channels by dividing one unlicensed band into at least multiple subbands. In so doing, the LTE-U base station can set the same or different bandwidth interval of the multi-channels. For example, the LTE-U base station can set 20 MHz channel to the four 5 MHz multi-channels so as to produce the same bandwidth of the multi-channels as shown in FIG. 5 or FIG. 6. For example, the LTE-U base station can set 20 MHz channel to one 10 MHz channel and two 5 MHz channels so as to produce the different bandwidths of the multi-channels.

In operation S1502, the LTE-U base station can synchronize or asynchronize the configured multi-channels.

For example, the LTE-U base station can divide the 20 MHz channel into four 5 MHz channels and then synchronize the channels as shown in FIG. 5.

For example, the LTE-U base station can divide the 20 MHz channel into four 5 MHz channels and then asynchronize the channels as shown in FIG. 6. In so doing, the multi-channel synchronization can be shifted within one subframe at regular time intervals. For example, the LTE-U base station can synchronize the multi-channels so as to shift the subframe boundaries of the four 5 MHz channels at 250 μs intervals as shown in FIG. 6. For example, the LTE-U base station can synchronize the multi-channels so as to shift the subframe boundaries of the four 5 MHz channels at different intervals.

When determining the multi-channels, the LTE-U base station can synchronize its multi-channels with multi-channels corresponding to another base station. For example, the multi-channels (e.g., four 5 MHz channels) used by one base station can be synchronized with the multi-channels used by the other base station as shown in FIG. 8. For example, the first channel 801 used by the LTE-U eNB A can be synchronized with the first channel 803 used by the LTE-U eNB B as shown in FIG. 8. When this condition is satisfied, the eNB A and the eNB B can employ the base station cooperative communication technique such as CoMP and ICIC.

Figure 16:
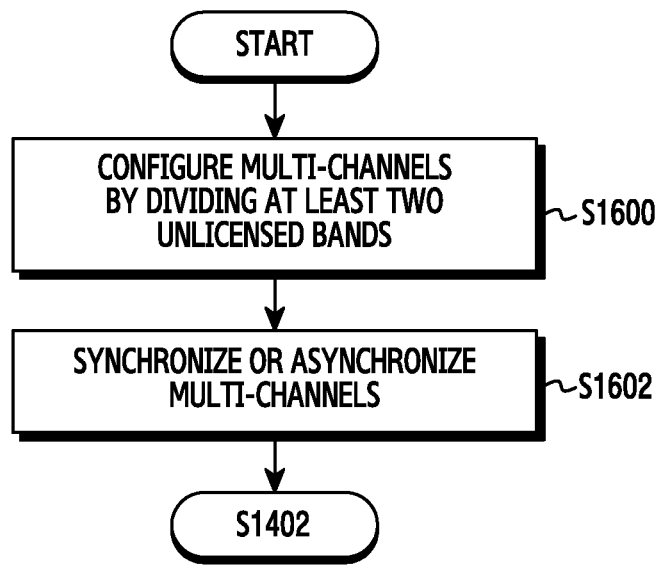
FIG. 16 illustrates a method for setting a multi-channel in a base station of a wireless communication system according to an embodiment of the present disclosure.

FIG. 16 is a flowchart of a method for configuring a multi-channel in a base station of a wireless communication system according to an embodiment of the present disclosure.

Referring to FIG. 16, in operation S1600, the LTE-U base station can configure multi-channels by dividing at least two unlicensed bands. For example, the LTE-U base station can configure the multi-channels using the five unlicensed bands of the 20 MHz bandwidth as shown in FIGS. 11A and 11B.

In so doing, the LTE-U base station can set the equal bandwidth interval of the multi-channels. For example, the LTE-U base station can configure the five channels of the 20 MHz bandwidth with the five unlicensed bands of the 20 MHz bandwidth as shown in FIGS. 11A and 11B. Alternatively, the LTE-U base station may determine different bandwidth intervals of the multi-channels. For example, the LTE-U base station can configure one 40 MHz channel and three 20 MHz channels with the five unlicensed bands of the 20 MHz bandwidth.

In operation S1602, the LTE-U base station can synchronize or asynchronize the configured multi-channels.

For example, the LTE-U base station can synchronize the five 20 MHz channels. For example, the LTE-U base station can asynchronize the five 20 MHz channels as shown in FIGS. 11A and 11B. For example, the LTE-U base station can synchronize the multi-channels so as to shift the subframe boundaries of the five 20 MHz channels at 200 μs intervals. For example, the LTE-U base station can synchronize the multi-channels so as to shift the subframe boundaries of the five 20 MHz channels at different intervals.

Figure 17:
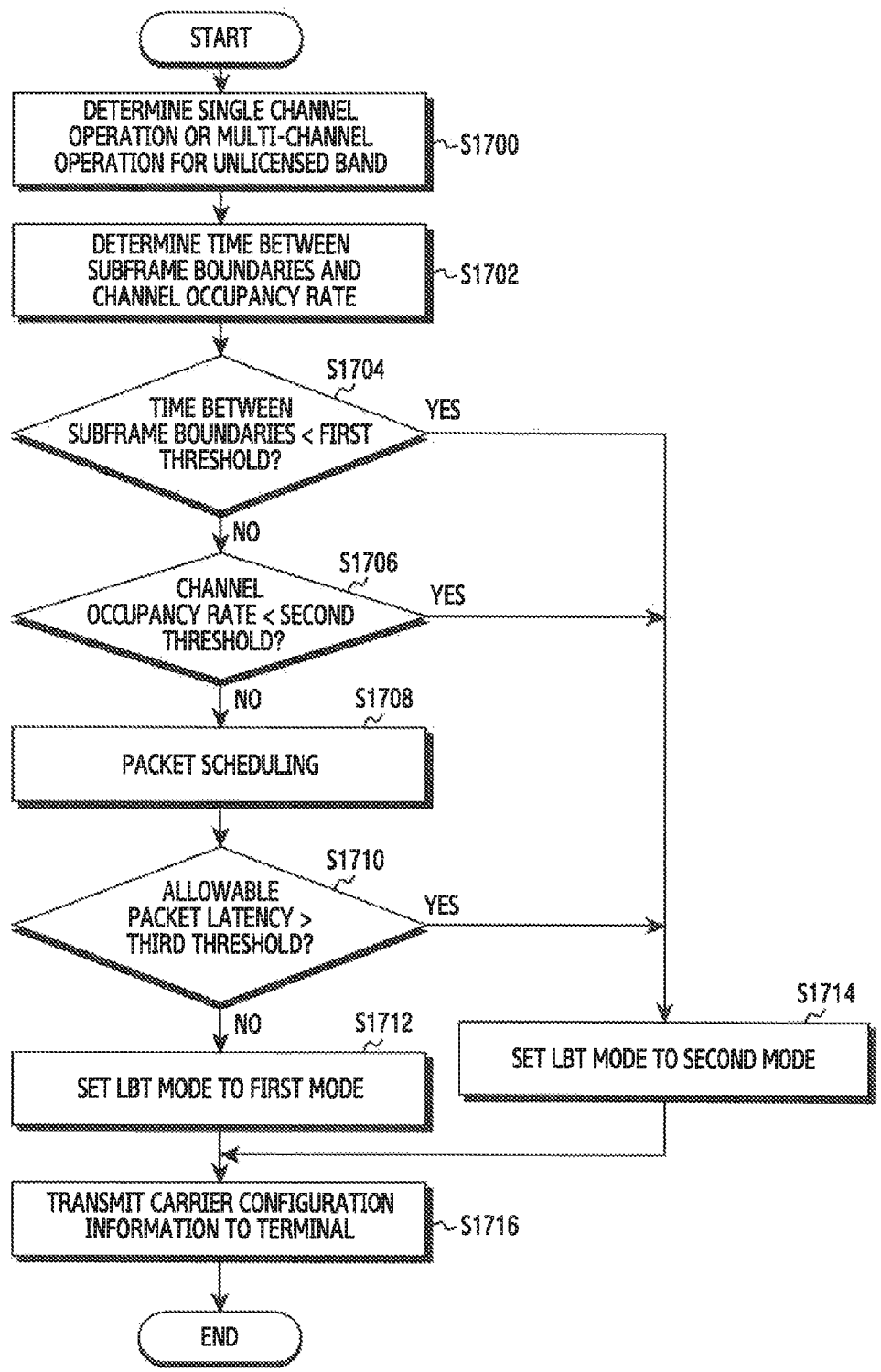
FIG. 17 illustrates a method of a base station for transmitting carrier configuration information in a wireless communication system according to an embodiment of the present disclosure.

FIG. 17 is a flowchart of a method of a base station for transmitting carrier configuration information in a wireless communication system according to an embodiment of the present disclosure.

In operation S1700, the LTE-U base station can determine one of the single channel operation and the multi-channel operation for at least one unlicensed band. Since operation S1700 is the same as operation S1400 as aforementioned, it is not further explained.

In operation S1702, the LTE-U base station can obtain the time between the subframe boundaries according to the determined channel operation. The LTE-U base station can determine the occupancy rate (or the collision rate) of the unlicensed channel. Herein, the occupancy rate of the un licensed channel can indicate how many LTE-U and WLAN devices are present in the corresponding channel.

In operation S1704, the LTE-U base station can compare the time between the determined subframe boundaries with a first threshold. The first threshold can be predefined. When the time between the determined subframe boundaries falls below the first threshold, the LTE-U base station goes to operation S1714. Otherwise, the LTE-U base station goes to operation S1706.

In operation S1706, the LTE-U base station can compare the channel occupancy rate of the determined unlicensed channel with a second threshold. The second threshold can be predefined. When the channel occupancy of the determined unlicensed channel falls below the second threshold, the LTE-U base station goes to operation S1714. Otherwise, the LTE-U base station goes to operation S1708.

In operation S1708, the LTE-U base station can schedule at least one packet to transmit to at least one LTE-U terminal. In operation S1710, the LTE-U base station can compare an allowable latency of the scheduled packet with a third threshold. The third threshold can be predefined. When the allowable latency of the scheduled packet exceeds the third threshold, the LTE-U base station goes to operation S1714. Otherwise, the LTE-U base station goes to operation S1712.

In operation S1712, the LTE-U base station can set the LBT mode to the first mode. Herein, the first mode may indicate a mode so that the LTE-U base station transmits the channel preservation signal from the transmission determination time to the subframe start point for the sake of the data transmission. For example, in the first mode, when the LTE-U base station gets the transmission opportunity at a random time, the LTE-U base station transmits the channel preservation signal until a new subframe boundary, transmits the control information, and starts the data transmission and reception after the LTE-U terminal acquires the control information as shown in FIG. 12. The first mode does not lose the channel to the other LTE-U device or the WLAN device but lessens the frequency utilization.

In operation S1714, the LTE-U base station can set the LBT mode to the second mode. Herein, the second mode may indicate so that the LTE-U base station transmits data by occupying the single channel or the multi-channels at the subframe start point for the sake of the data transmission. For example, in the second mode, the LTE-U base station can adjust the listening period so that the LTE-U base station gets the transmission opportunity at the subframe boundary, transmit the control information at the subframe boundary, and thus transmit and receive data without the channel preservation signal as shown in FIG. 12. The second mode can lose the channel to the WLAN device because it does not use the channel preservation signal, but increase the frequency utilization.

In operation S1716, the LTE-U base station can share the carrier configuration information and the LBT mode information. For example, as shown in FIG. 9, the LTE-U base station can transmit to the LTE-U terminal, the center frequency, start frequency, end frequency, frequency band, and subframe boundary start information of the divided channels being the LTE-U channel configuration information and the determined LBT mode (the first mode or the second mode) information.

Figure 18:
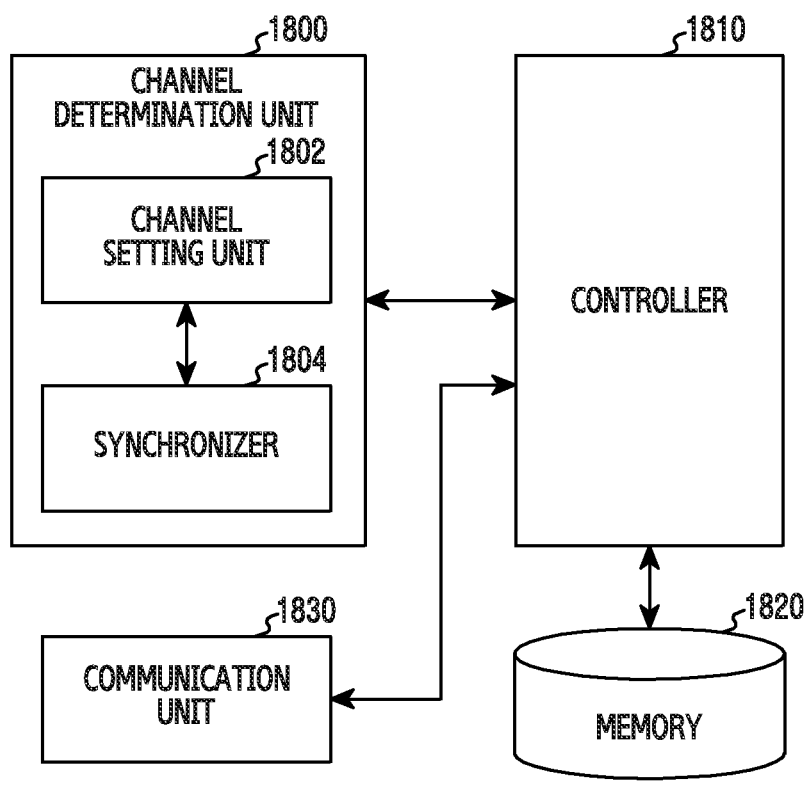
FIG. 18 illustrates a base station in a wireless communication system according to an embodiment of the present disclosure.

FIG. 18 is a block diagram of a base station in a wireless communication system according to an embodiment of the present disclosure.

Referring to FIG. 18, the base station includes a channel determination unit 1800, a controller 1810, a memory 1820, and a communication unit 1830.

The channel determination unit 1800 can determine one of the single channel operation and the multi-channel operation for at least one unlicensed band. For doing so, the channel determination unit 1300 can include a channel setting unit 1802 and a synchronizer 1804.

The channel setting unit 1802 can set the unlicensed band to the single channel according to the single channel operation. The channel setting unit 1802 can configure the multi-channels by dividing the unlicensed band into the plurality of the subbands using either the synchronous multi-channel operation or the asynchronous multi-channel operation. In so doing, the channel setting unit 1802 can set the equal bandwidth interval of the multi-channels. For example, the channel setting unit 1802 can set 20 MHz channel to 5 MHz multi-channels corresponding to four subbands as shown in FIG. 5 and FIG. 6. Alternatively, the channel setting unit 1802 can set the different bandwidth intervals of the multi-channels. For example, the channel setting unit 1802 can set the 20 MHz channel to one 10 MHz channel and two 5 MHz channels.

The channel setting unit 1802 may configure the multi-channels by dividing at least two unlicensed bands. For example, the channel setting unit 1802 can set five 20 MHz unlicensed bands to five 20 MHz channels as shown in FIGS. 11A and 11B.

In so doing, the channel setting unit 1802 can set the equal bandwidth interval of the multi-channels. For example, as shown in FIGS. 11A and 11B, the channel setting unit 1802 can set the five channels of 20 MHz bandwidth with the five unlicensed bands of the 20 MHz bandwidth. The channel setting unit 1802 can set different bandwidth intervals of the multi-channels. For example, the channel setting unit 1802 can configure one 40 MHz channel and three 20 MHz channels with the five unlicensed bands of the 20 MHz bandwidth. The synchronizer 1804 can synchronize or asynchronize the configured multi-channels. For example, as shown in FIG. 5, when the base station divides the 20 MHz channel into four 5 MHz channels, the synchronizer 1804 can synchronize the channels. For example, as shown in FIG. 6, when the base station can divide the 20 MHz channel into four 5 MHz channels, the synchronizer 1804 can asynchronize the channels.

In so doing, the multi-channel synchronization can be shifted at regular time intervals within one subframe. For example, the synchronizer 1804 can synchronize the multi-channels so as to shift the subframe boundaries of the four 5 MHz channels at 250 μs intervals as shown in FIG. 6. For example, the synchronizer 1804 can synchronize the multi-channels so as to shift the subframe boundaries of the four 5 MHz channels at different intervals. In the multi-channel configuration, the synchronizer 1804 can synchronize the multi-channels of the base station with the multi-channels corresponding to another neighboring base station. For example, as shown in FIG. 8, the synchronizer 1804 can synchronize the first channel 801 used by the LTE-U eNB A with the first channel 803 used by the LTE-U eNB B.

The memory 1820 can store data for operating the base station. The memory 1820 can store the carrier configuration information of the determined single channel or multi-channels. Herein, the carrier configuration information can include at least one of the center frequency, the start frequency, the end frequency, the frequency band, and the subframe boundary start information of the single channel or the multi-channels.

The controller 1810 can transmit the information stored in the memory 1820 to the terminal through the communication unit 1830. For example, the controller 1810 can transmit the carrier configuration information to share it with the terminal. For example, when the unlicensed channel 20 MHz are divided into two or more channels and asynchronized, the LTE-U carrier configuration information can include the channel division information of the divided channels and the channel synchronization information of the divided asynchronous channels. For example, the channel division information can include the division information indicating the unlicensed channel divided, and the information including the center frequency, the start frequency, and the end frequency of the divided channels. The channel synchronization information can include the synchronization information indicating that the divided channels are asynchronous, and the frequency band and subframe boundary start information of the divided channels. For example, the subframe boundary start information can include the timing offset information of the divided channels 907 based on the LTE PCell carrier 905.

When data transmission using the single channel or the multi-channel is required, the controller 1810 can transmit the channel preservation signal from the data transmission determination time until the start point of the subframe. Herein, the transmitting can include broadcasting. The controller 1810 can transmit at least one of the PSS, the SSS, and the cell-specific reference signal for the synchronization with the LTE-U terminal over the channel preservation signal. The channel preservation signal can be used not only to restrict channel access of another WLAN device but to synchronize the terminal with the LTE-U base station.

The controller 1810 can transmit the first subframe including the synchronization signal (PSS and SSS) for synchronizing with the terminal. For example, the controller 1810 can always set the first subframe transmitted after occupying the channel, to the 0-th subframe, insert a plurality of PSSs and SSSs into the 0-th subframe, and then transmit the 0-th subframe to the terminal.

The communication unit 1830 can transmit the carrier configuration information, the channel preservation signal, the synchronization signal for the synchronization with the terminal, and the cell-specific reference signal, stored in the memory 1820, to the terminal under control of the controller 1810.

Figure 19:
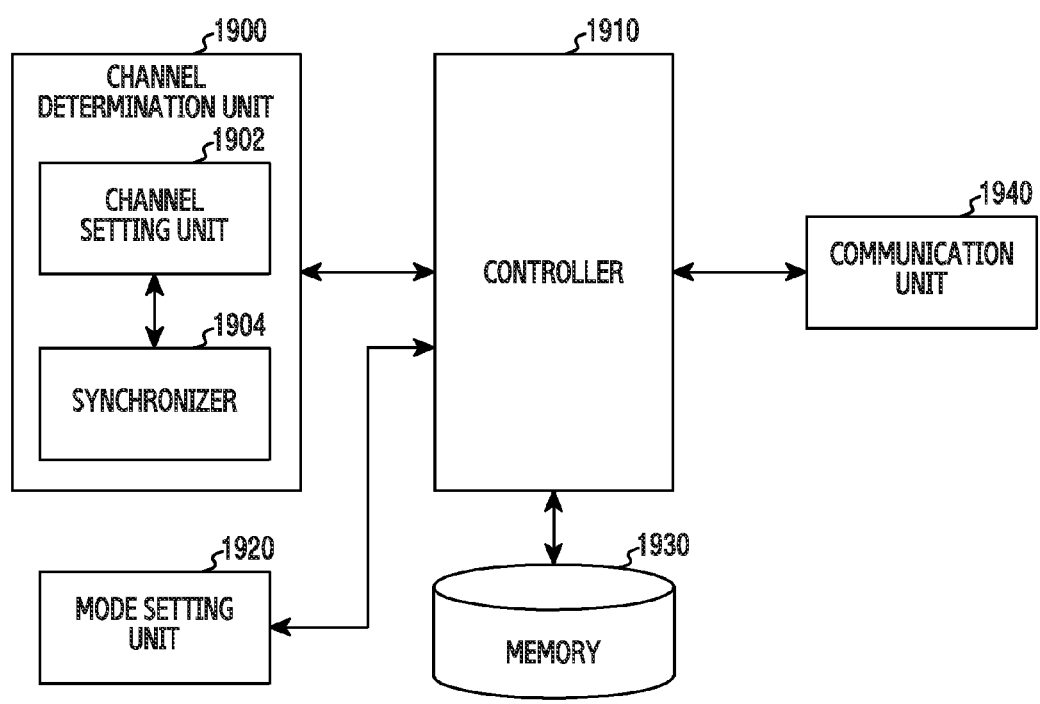
FIG. 19 illustrates a base station in a wireless communication system according to an embodiment of the present disclosure.

FIG. 19 is a block diagram of a base station in a wireless communication system according to an embodiment of the present disclosure.

Referring to FIG. 19, the base station can include a channel determination unit 1900, a controller 1910, a mode setting unit 1920, a memory 1930, and a communication unit 1940.

The channel determination unit 1900 determines either the single channel operation or the multi-channel operation for at least one unlicensed band. For doing so, the channel determination unit 1900 can include a channel setting unit 1902 and a synchronizer 1904. The channel setting unit 1902 and the synchronizer 1904 conduct the same functions as the channel setting unit 1802 and the synchronizer 1804 of FIG. 18 and thus shall not be further described.

The memory 1930 can store at least one of the carrier configuration information of the single channel or multi-channel and the LBT mode information. Herein, the carrier configuration information can include at least one of the center frequency, the start frequency, the end frequency, the frequency band, and the subframe boundary start information of the single channel or the multi-channels. The LBT mode information can indicate the LBT mode determined by the mode setting unit 1920. The communication unit 1940 can transmit the information stored in the memory 1930 to the terminal under control of the controller 1910.

The controller 1910 performs the same functions as the controller 1810 of FIG. 18. In addition, the controller 1910 can determine the LBT mode. For example, the controller 1910 can compare the time between the subframe boundaries with the first threshold preset. For example, the controller 1910 can compare the unlicensed band channel occupancy rate with the second threshold preset. For example, the controller 1910 can compare the allowable latency of the packet to transmit to the terminal with the third threshold preset. The controller 1910 can generate and transmit to the terminal, the LBT mode information according to the LBT mode received from the mode setting unit 1920.

The mode setting unit 1920 can set the LBT mode for the data transmission according to the comparison result of the controller 1910. In particular, the mode setting unit 1920 can set the LBT mode to the first mode when the time between the subframe boundaries exceeds the first threshold, the unlicensed band channel occupancy rate exceeds the second threshold, or the allowable latency of the packet to transmit to the terminal falls below the third threshold. Herein, the first mode may indicate a mode so that the LTE-U base station transmits the channel preservation signal, for example, until the new subframe boundary when the LTE-U base station gets the transmission opportunity at a random time, transmits the control information transmission, and initiate data transmission and reception after the LTE-U terminal acquires the control information as shown in FIG. 12.

The mode setting unit 1920 can set the LBT mode to the second mode when the time between the subframe boundaries falls below the first threshold, the unlicensed band channel occupancy rate falls below the second threshold, or the allowable latency of the packet to transmit to the terminal exceeds the third threshold. Herein, the second mode may indicate a mode so that the LTE-U base station transmits data by occupying the single channel or the multi-channels at the subframe start point for the sake of the data transmission. For example, as shown in FIG. 12, in the second mode, the LTE-U base station can adjust the listening period so that the LTE-U base station gets the transmission opportunity at the subframe boundary, transmits the control information at the subframe boundary, and thus transmits and receives data without the channel preservation signal.

While the mode setting unit 1920 sets the LBT mode, the controller 1910 can set the LBT mode.

Figure 20:
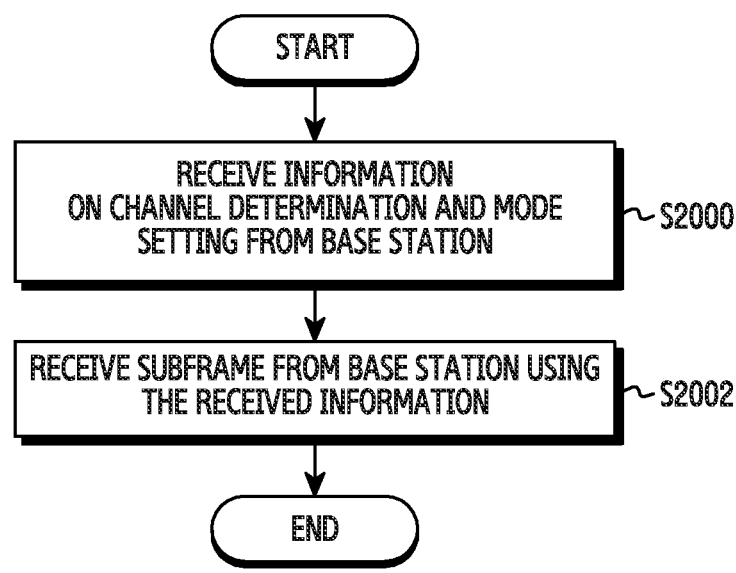
FIG. 20 illustrates a method of a terminal for receiving a subframe in a wireless communication system according to an embodiment of the present disclosure.

FIG. 20 is a flowchart of a method of a terminal for receiving a subframe in a wireless communication system according to an embodiment of the present disclosure.

Referring to FIG. 20, in operation S2000, the LTE-U terminal can receive the channel configuration and mode information from the base station. For example, the terminal can receive the carrier configuration information and the LBT mode information. For example, the carrier configuration information can include at least one of the center frequency, the start frequency, the end frequency, the frequency band, and the subframe boundary start information of the single channel or the multi-channels. For example, the LBT mode information can include information indicating the LBT mode selected by the base station.

In operation S2002, the LTE-U terminal can receive the data subframe from the base station using the received information over the single channel or the multi-channels. For example, the LTE-U terminal can receive the synchronization signal (e.g., PSS and SSS) from the first subframe to synchronize with the base station transmitting the channel preservation signal.

Figure 21:
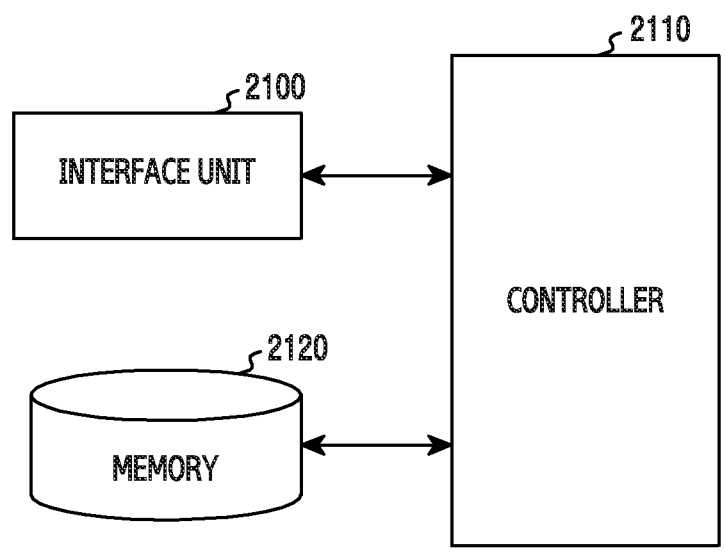
FIG. 21 illustrates a terminal in a wireless communication system according to an embodiment of the present disclosure.

FIG. 21 is a block diagram of a terminal in a wireless communication system according to an embodiment of the present disclosure.

Referring to FIG. 21, the terminal can include an interface unit 2100, a controller 2110, and a memory 2120.

The interface unit 2100 can receive the channel configuration and the mode information from the base station. For example, the interface unit 2100 can receive at least one of the carrier configuration information and the LBT mode information. For example, the carrier configuration information can include at least one of the center frequency, the start frequency, the end frequency, the frequency band, and the subframe boundary start information of the single channel or the multi-channels. For example, the LBT mode information can include the information indicating the LBT mode selected by the base station.

The memory 2120 can store basic data for operating the terminal. The memory 2120 stores the information received from the base station. For example, the memory 2120 can store at least one of the carrier configuration information and the LBT mode information.

The controller 2110 can receive the data subframe from the base station over the single channel or the multi-channels using the information stored in the memory 2120. For example, the controller 2110 can receive the synchronization signal (e.g., PSS and SSS) from the first subframe to synchronize with the base station transmitting the channel preservation signal.

So far, the channel contention in the unlicensed band has been explained. The present disclosure can more rapidly transmit the scheduling information to the terminal to transmit the subframe by configuring the multi-channel and the asynchronous multi-channel in the licensed band.

As set forth above, the wireless communication system using the unlicensed band can block the transmission opportunity from being taken by the wireless communication system supporting a different radio access technology (RAT) from the wireless communication system from the transmission determination time to the subframe boundary. Since the channel preservation signal is reduced in the wireless communication system using the unlicensed band, the wireless communication system can rapidly initiate the data transmission and reception after getting the channel and rapidly process the data transmission and reception. In addition, the wireless communication system can mitigate interference of the channel preservation signal. Further, overall frequency utilization of the unlicensed band can be enhanced by giving more communication opportunities to a device supporting a different communication system in the unlicensed band.

The methods as described in the claims and/or the specification of various embodiments of the present disclosure can be implemented using hardware, software, or a combination of them. As for the software, a non-transitory computer-readable storage medium storing one or more programs (software modules) may be provided. One or more programs stored in the non-transitory computer-readable storage medium may be configured for execution by one or more processors of a server or the electronic apparatus. One or more programs include instructions for controlling the electronic apparatus to execute the methods according to the various embodiments as described in the claims and/or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of those recording media. A plurality of memories may be equipped.

The programs may be stored in an attachable storage device accessible via a communication network such as Internet, Intranet, LAN, WLAN, or storage area network (SAN), or a communication network by combining these networks. The storage device can access the electronic apparatus through an external port. A separate storage device may access a portable electronic apparatus over a communication network.

While the present disclosure has been shown and described with reference to certain various embodiments thereof, it will be understood by those skilled in the art that various changes in form and details may be made therein without departing from the spirit and scope of the present disclosure as defined by the appended claims and their equivalents.

What is claimed is:

1. A method for operating a base station in a wireless communication system, the method comprising:
    determining whether a mode regarding a listen before talk (LBT) is a first mode or a second mode based on at least one of first information for an occupancy rate of a channel and second information for maximum allowable latency of transmission of data; and
    transmitting a signal for occupying the channel or the data according to the determined mode regarding the LBT,
    wherein the first mode is a mode that an end point of the LBT is earlier than a start point of a first subframe, and
    wherein the second mode is a mode that the end point of the LBT is identical to the start point of the first subframe.

2. The method of claim 1, further comprising:
    determining at least one channel in at least one unlicensed band using one of a single channel operation and a multi-channel operation;
    dividing and configuring the at least one unlicensed band into a plurality of channels; and
    synchronizing or asynchronizing the plurality of channels.

3. The method of claim 2, wherein the synchronizing of the plurality of channels comprises:
    shifting the synchronization for each of the plurality of channels by the same time duration within one subframe.

4. The method of claim 1, further comprising:
    determining at least one channel in at least one unlicensed band using one of a single channel operation and a multi-channel operation;
    configuring a plurality of channels with a plurality of unlicensed bands; and
    synchronizing or asynchronizing the plurality of channels.

5. The method of claim 4, wherein the synchronizing of the plurality of channels comprises:
    shifting the synchronization for each of the plurality channels by the same time duration within one subframe.

6. The method of claim 1, further comprising:
    determining at least one channel in at least one unlicensed band using one of a single channel operation and a multi-channel operation; and
    synchronizing the at least one channel with at least one channel corresponding to a neighboring base station.

7. The method of claim 1, further comprising:
    acquiring at least one channel according to a request for transmitting the data; and
    transmitting carrier configuration information about configuration of the determined at least one channel, to a terminal.

8. The method of claim 1, wherein the transmitting of the signal or the data comprises:
    transmitting at least one of a synchronization signal and a cell-specific reference signal using the signal.

9. The method of claim 1, wherein the transmitting of the signal or the data comprises:
    if the mode regarding the LBT is the first mode, transmitting the signal for occupying the channel from the end point of the LBT to the start point of the first subframe; and
    if the mode regarding the LBT is the second mode, transmitting the data at the start point of the first subframe without transmission of the signal for occupying the channel.

10. The method of claim 9, wherein the determining whether the mode regarding the LBT is the first mode or the second mode comprises:
    if the first information for the occupancy rate is equal to or less than a threshold or the second information for the latency is greater than another threshold, determining that the mode regarding the LBT is the second mode.

11. The method of claim 9, wherein the determining whether the mode regarding the LBT is the first mode or the second mode comprises:
    if the first information for the occupancy rate is greater than a threshold or the second information for the latency is equal to or less than another threshold, determining that the mode regarding the LBT is the first mode.

12. The method of claim 9, further comprising:
transmitting information on the determined mode for the LBT to a terminal.

13. A method for operating a terminal in a wireless communication system, the method comprising:
receiving a signal for occupying a channel or data according to a mode regarding a listen before talk (LBT) from the base station,
wherein the mode regarding the LBT is determined as a first mode or a second mode based on at least one of first information for an occupancy rate of the channel and second information for maximum allowable latency of transmission of the data,
wherein the first mode is a mode that an end point of the LBT is earlier than a start point of a first subframe, and
wherein the second mode is a mode that the end point of the LBT is identical to the start point of the first subframe.

14. An apparatus of a base station in a wireless communication system, the apparatus comprising:
a transceiver; and
at least one processor operatively coupled with the transceiver,
wherein the at least one processor configured to control to:
determine whether a mode regarding a listen before talk (LBT) is a first mode or a second mode based on at least one of first information for an occupancy rate of a channel and second information for maximum allowable latency of transmission of rate, and
transmit a signal for occupying the channel or the data according to the determined mode regarding the LBT,
wherein the first mode is a mode that an end point of the LBT is earlier than a start point of a first subframe, and
wherein the second mode is a mode that the end point of the LBT is identical to the start point of the first subframe.

15. The apparatus of claim 14, wherein the at least one processor is further configured to control to:
determine at least one channel in at least one unlicensed band using one of a single channel operation and a multi-channel operation;
divide and configure the at least one unlicensed band into a plurality of channels; and
synchronize or asynchronize the plurality of channels.

16. The apparatus of claim 15, wherein the at least one processor is configured to control to synchronize the channels by shifting the synchronization for each of the plurality of channels by the same time within one subframe.

17. The apparatus of claim 14, wherein the at least one processor is further configured to control to:
determine at least one channel in at least one unlicensed band using one of a single channel operation and a multi-channel operation;
configure a plurality of channels with a plurality of unlicensed bands; and
synchronize or asynchronize the plurality of channels.

18. The apparatus of claim 17, wherein the at least one processor is further configured to control to synchronize the channels by shifting the synchronization of each of the plurality of channels by the same time within one subframe.

19. The apparatus of claim 14, wherein the at least one processor is further configured to control to:
determine at least one channel in at least one unlicensed band using one of a single channel operation and a multi-channel operation; and
synchronize the at least one channel with at least one channel corresponding to a neighboring base station.

20. The apparatus of claim 14, wherein the at least one processor is further configured to control to:
acquire at least one channel according to a request for transmitting the data; and
transmit carrier configuration information about configuration of the determined at least one channel, to a terminal.

21. The apparatus of claim 14, wherein the at least one processor is configured to control to transmit at least one of a synchronization signal and a cell-specific reference signal using the signal.

22. The apparatus of claim 14, wherein the at least one processor is configured to control to:
if the mode regarding the LBT is the first mode, transmit the signal for occupying the channel from the end point of the LBT to the start point of the first subframe; and
if the mode regarding the LBT is the second mode, transmit the data at the start point of the first subframe without transmission of the signal for occupying the channel.

23. The apparatus of claim 22, wherein the at least one processor is configured to control to, if the first information for the occupancy rate is equal to or less than a threshold or the second information for the latency is greater than another threshold, determine that the mode regarding the LBT is the second mode.

24. The apparatus of claim 22, wherein the at least one processor is configured to control to, if the first information for the occupancy rate is greater than a threshold or the second information for the latency is equal to or less than another threshold, determine that the mode regarding the LBT is the first mode.

25. The apparatus of claim 22, wherein the at least one processor is further configured to control to transmit information on the mode for the LBT to a terminal.

26. An apparatus of a terminal in a wireless communication system, the apparatus comprising:
transceiver; and
at least one processor operatively coupled with the transceiver,
wherein the at least one processor configured to control to receive a signal for occupying a channel or data according to a mode regarding a listen before talk (LBT) from the base station,
wherein the mode regarding the LBT is determined as a first mode or a second mode based on at least one of first information for an occupancy rate of the channel and second information for maximum allowable latency of transmission of the data,
wherein the first mode is a mode that an end point of the LBT is earlier than a start point of a first subframe, and
wherein the second mode is a mode that the end point of the LBT is identical to the start point of the first subframe.

27. The method of claim 1, wherein the mode regarding the LBT comprises a mode for determining whether the channel is occupied before the data is transmitted in an unlicensed band.

28. The method of claim 13, wherein the mode regarding the LBT comprises a mode for determining whether the channel is occupied before the data is transmitted in an unlicensed band.

29. The apparatus of claim 14, wherein the mode regarding the LBT comprises a mode for determining whether the channel is occupied before the data is transmitted in an unlicensed band.

30. The apparatus of claim 26, wherein the mode regarding the LBT comprises a mode for determining whether the channel is occupied before the data is transmitted in an unlicensed band.

* * * * *